US012619828B2

(12) United States Patent
Cui et al.

(10) Patent No.: US 12,619,828 B2
(45) Date of Patent: May 5, 2026

(54) READING ORDER DETECTION IN A DOCUMENT

(71) Applicant: Microsoft Technology Licensing, LLC, Redmond, WA (US)

(72) Inventors: Lei Cui, Beijing (CN); Yiheng Xu, Beijing (CN); Yang Xu, Harbin (CN); Furu Wei, Beijing (CN); Zilong Wang, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 18/563,002

(22) PCT Filed: May 23, 2022

(86) PCT No.: PCT/US2022/030466
§ 371 (c)(1),
(2) Date: Nov. 21, 2023

(87) PCT Pub. No.: WO2023/278072
PCT Pub. Date: Jan. 5, 2023

(65) Prior Publication Data
US 2024/0265206 A1 Aug. 8, 2024

(30) Foreign Application Priority Data
Jun. 30, 2021 (CN) .......................... 202110739466.3

(51) Int. Cl.
*G06F 40/106* (2020.01)
*G06F 40/30* (2020.01)
*G06V 30/414* (2022.01)
(52) U.S. Cl.
CPC ............ *G06F 40/30* (2020.01); *G06V 30/414* (2022.01); *G06F 40/106* (2020.01)

(58) Field of Classification Search
CPC ..................................................... G06F 40/106
See application file for complete search history.

(56) References Cited

U.S. PATENT DOCUMENTS

| | | | |
|---|---|---|---|
| 8,539,342 | B1 | 9/2013 | Lewis |
| 8,649,600 | B2 | 2/2014 | Saund |

(Continued)

FOREIGN PATENT DOCUMENTS

| | | | | |
|---|---|---|---|---|
| CN | 105760507 A | 7/2016 | | |
| CN | 109933780 A | 6/2019 | | |
| CN | 117912045 A | * 4/2024 | ........... | G06N 3/0455 |

OTHER PUBLICATIONS

Pan, et al. "Document Layout Analysis and Reading Order Determination for a Reading Robot," IEEE, 2010. (Year: 2010).*

(Continued)

*Primary Examiner* — Feng-Tzer Tzeng
(74) *Attorney, Agent, or Firm* — Schwegman Lundberg & Woessner, P.A.

(57) ABSTRACT

According to embodiments of the present disclosure, there is provided a solution for reading order detection in a document. In the solution, a computer-implemented method includes: determining a text sequence and layout information presented in a document, the text sequence comprising a plurality of text elements, the layout information indicating a spatial layout of the plurality of text elements in the document; generating a plurality of semantic feature representations corresponding to the plurality of text elements based at least on the text sequence and the layout information; and determining a reading order of the plurality of text elements in the document based on the plurality of semantic feature representations. According to the solution, the introduction of the layout information can better characterize a spatial layout manner of the text elements in a specific (Continued)

document, thereby determining the reading order more effectively and accurately.

13 Claims, 12 Drawing Sheets

(56) References Cited

U.S. PATENT DOCUMENTS

| | | | |
|---|---|---|---|
| 9,014,478 B2 | 4/2015 | Itoko | |
| 10,796,145 B2 | 10/2020 | Anisimovskiy | |
| 2018/0121393 A1 | 5/2018 | Masalovitch | |
| 2020/0311185 A1* | 10/2020 | Agrawal | G06F 40/103 |
| 2020/0320329 A1 | 10/2020 | Bui | |
| 2021/0081729 A1 | 3/2021 | Huang et al. | |
| 2021/0272599 A1* | 9/2021 | Patterson | G06N 3/08 |

OTHER PUBLICATIONS

"Duplicate Word Finder", accessed on link https://web.archive.org/web/20201018010405/https:/codepen.io/finnhvman/pen/oPwXRa, Oct. 18, 2020, 1 page.
"PDF3: Ensuring correct tab and reading order in PDF documents", accessed on link https://www.w3.org/TR/WCAG20-TECHS/PDF3.html#:~:text=The%20reading%20order%20of%20a,PDF%20document's%20content%20tree%20structure, Oct. 7, 2016, 10 pages.
Aiello, et al., "Bidimensional Relations for Reading Order Detection", In Publication of University of Groningen, Johann Bernoulli Institute for Mathematics and Computer Science, 2003, 5 pages.
Bello, et al., "Attention Augmented Convolutional Networks", arXiv:1904.09925, Sep. 9, 2020, 13 pages.
Ceci, et al., "A Data Mining Approach to Reading Order Detection", In Proceedings of Ninth International Conference on Document Analysis and Recognition, vol. 2, Sep. 23, 2007, 5 pages.
Clausner, et al., "The Significance of Reading Order in Document Recognition and its Evaluation", In 12th International Conference on Document Analysis and Recognition, Aug. 25, 2013, pp. 688-692.
Devlin, et al., "BERT: Pre-training of Deep Bidirectional Transformers for Language Understanding", In Proceedings of the 2019 Conference of the North American Chapter of the Association for Computational Linguistics: Human Language Technologies, vol. 1, Jun. 2, 2019, pp. 4171-4186.
Dong, et al., "Unified Language Model Pre-training for Natural Language Understanding and Generation", In Proceedings of Annual Conference on Neural Information Processing Systems, Dec. 8, 2019, 13 pages.
Ferilli, et al., "Abstract Argumentation for Reading Order Detection", In Proceedings of the ACM Symposium on Document Engineering, Sep. 16, 2014, pp. 45-48.
Gralinski, et al., "Kleister: A novel task for Information Extraction involving Long Documents with Complex Layout", arXiv:2003.02356, Mar. 4, 2020, 14 pages.
International Search Report and Written Opinion Issued in PCT Application No. PCT/US22/030466, Sep. 14, 2022, 13 pages.
Jaume, et al., "Funsd: A Dataset for Form Understanding in Noisy Scanned Documents", In Proceedings of International Conference on Document Analysis and Recognition Workshops, Sep. 22, 2019, 6 pages.
Kiram, Ravi., "Find and Remove Repeated Words Using GREP", accessed on link https://web.archive.org/web/20201127033936/https:/creativepro.com/find-remove-repeated-words-grep/, Nov. 27, 2020, 7 pages.
Kruk, et al., "Integrating Text and Image: Determining Multimodal Document Intent in Instagram Posts", Proceedings of the 2019 Conference on Empirical Methods in Natural Language Processing, Apr. 19, 2019, pp. 4622-4632.

Li, et al., "An End-to-End OCR Text Re-organization Sequence Learning for Rich-text Detail Image Comprehension", In Proceedings of 16th European Conference of Computer Vision, Aug. 23, 2020, 16 pages.
Li, et al., "DocBank: A Benchmark Dataset for Document Layout Analysis", In Proceedings of the 28th International Conference on Computational Linguistics, Dec. 8, 2020, pp. 949-960.
Li, et al., "TableBank: Table Benchmark for Image-based Table Detection and Recognition", In Proceedings of the 12th Language Resources and Evaluation Conference, May 11, 2020, pp. 1918-1925.
Liu, et al., "Graph Convolution for Multimodal Information Extraction from Visually Rich Documents", In Proceedings of the Conference of the North American Chapter of the Association for Computational Linguistics: Human Language Technologies, vol. 2, Jun. 2, 2019, pp. 32-39.
Lockard, et al., "ZeroShotCeres: Zero-Shot Relation Extraction from Semi-Structured Webpages", In Proceedings of the 58th Annual Meeting of the Association for Computational Linguistics, Jul. 2020, pp. 8105-8117.
Majumder, et al., "Representation Learning for Information Extraction from Form-like Documents", In Proceedings of the 58th Annual Meeting of the Association for Computational Linguistics, Jul. 2020, pp. 6495-6507.
Malerba, et al., "Learning to Order: A Relational Approach", In Proceedings of International Workshop on Mining Complex Data, Springer, Sep. 2007, pp. 209-223.
Malerba, et al., "Machine Learning for Reading Order Detection in Document Image Understanding", In Machine Learning in Document Analysis and Recognition, vol. 90, 2008, pp. 45-69.
Malerba, et al., "Machine Learning for Reading Order Detection in Document Image Understanding", Machine Learning in Document Analysis and Recognition, Dec. 2007, vol. 90, pp. 49-72.
Mathew, et al., "DocVQA: A Dataset for VQA on Document Images", arXiv:2007.00398v2, Jul. 2020, 23 pages.
Papineni, et al., "BLEU: a Method for Automatic Evaluation of Machine Translation", Proceedings of the 40th Annual Meeting of the Association for Computational Linguistics (ACL), Jul. 6, 2002, pp. 311-318.
Park, et al., "CORD: A Consolidated Receipt Dataset for Post-OCR Parsing", In Proceedings of 33rd Conference on Neural Information Processing Systems, 2019, 4 pages.
Pramanik, et al., "Towards a Multi-modal, Multi-task Learning based Pre-training Framework for Document Representation Learning", arXiv:2009.14457, Sep. 30, 2020, 8 pages.
Sarkhel, et al., "Deterministic Routing between Layout Abstractions for Multi-Scale classification of Visually Rich Documents", In Proceedings of the Twenty-Eighth International Joint Conference on Artificial Intelligence, Aug. 2019, pp. 3360-3366.
Shaw, et al., "Self-Attention with Relative Position Representations", In Proceedings of the 2018 Conference of the North American Chapter of the Association for Computational Linguistics: Human Language Technologies, vol. 2, Jun. 2018, pp. 464-468.
Siegel, et al., "Extracting Scientific Figures with Distantly Supervised Neural Networks", In Proceedings of the 18th ACM/IEEE on Joint Conference on Digital Libraries, Jun. 3, 2018, pp. 223-232.
Stanislawek, et al., "Kleister: Key Information Extraction Datasets Involving Long Documents with Complex Layouts", arXiv:2105.05796, May 12, 2021, 16 pages.
Wang, et al., "Layout Reader: Pre-training of Text and Layout for Reading Order Detection", arXiv:2108.11591, Aug. 27, 2021, 10 pages.
Wei, et al., "Robust Layout-aware IE for Visually Rich Documents with Pre-trained Language Models", In Proceedings of the 43rd International ACM SIGIR Conference on Research and Development in Information Retrieval, Jul. 25, 2020, pp. 2367-2376.
Wolf, et al., "Huggingface's Transformers: State-of-the-Art Natural Language Processing", arXiv:1910.03771, Oct. 16, 2019, 11 pages.
Xu, et al., "LayoutLM: Pre-training of Text and Layout for Document Image Understanding", In Proceedings of the 26thACM SIGKDD International Conference on Knowledge Discovery & Data Mining, Aug. 23, 2020, pp. 1192-1200.

(56) References Cited

OTHER PUBLICATIONS

Xu, et al., "LayoutLMv2: Multi-modal Pre-training for Visually-rich Document Understanding", arXiv:2012.14740v1, Dec. 29, 2020, 16 pages.

Xu, et al., "Layoutlmv2: Multi-Modal Pre-Training for Visually-Rich Document Understanding", In Proceedings of the 59th Annual Meeting of the Association for Computational Linguistics, 2021, pp. 2579-2591.

Yang, et al., "Learning to Extract Semantic Structure from Documents Using Multimodal Fully Convolutional Neural Networks", In Proceedings of IEEE Conference on Computer Vision and Pattern Recognition, Jul. 21, 2017, pp. 4342-4351.

Yu, et al., "Pick: Processing Key Information Extraction from Documents Using Improved Graph Learning-Convolutional Networks", arXiv:2004.07464, Jul. 18, 2020, 8 pages.

Zhang, et al., "TRIE: End-to-End Text Reading and Information Extraction for Document Understanding", arXiv:2005.13118, May 2020, 9pages.

Zhao, Herin., "Microsoft ImageBERT | Cross-modal Pretraining with Large-scale Image-Text Data", accessed on link https://medium.com/syncedreview/microsoft-imagebert-cross-modal-pretraining-with-large-scale-image-text-data-90d0e9c3c97a, Jan. 28, 2020, 10 pages.

Zhong, et al., "PubLayNet: largest dataset ever for document layout analysis", In Proceedings of International Conference on Document Analysis and Recognition, Sep. 20, 2019, pp. 1015-1022.

First Office Action Received for Chinese Application No. 202110739466.3, mailed on Jan. 13, 2026, 23 pages. (English translation Provided).

* cited by examiner

200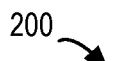

| Table 5.9.33A –Kangaroo Point south neighbourhood plan: material change of use | | |
|---|---|---|
| Use | Categories of development and assessment | Assessment benchmarks |
| If in the neighborhood plan area | | |
| MAC, if accessible development where not listed in this table | No change 210    220 | Kangaroo Point south neighbourhood plan code |
| If in the Mixed use zone | | |
| Centre activities (activity group) | Accepted development, subject to compliance with identified requirements | |
| | If involving an existing premises, where: (a) gross floor area is no greater than 1,500m2 for any individual tenancy where shop or shop component of a shopping centre; (b) complying with any acceptable outcomes in section A of the Centre or mixed use code | Not applicable |

| Table 5.9.55A – Kangaroo Point south neighbourhood plan material change of use 1 | | |
|---|---|---|
| Use 2 | Categories of development and assessment 3 | Assessment benchmarks 4 |
| If in the neighbourhood plan area 5 | | |
| MAC if acceptable development where not listed in this table 6 | No change 7 | Kangaroo Point south neighbourhood plan code 8 |
| If in the Mixed use zone 9 | | |
| Centre activities (shop) 10 | Accepted development, subject to compliance with identified requirements 11 | |
| | If involving an existing premises where: (a) gross floor area is no greater than 1,500m2 for any individual tenancy where Shop or shop component of a shopping centre; (b) complying with any acceptable outcomes in section X of the Centre or mixed use code 12 | Not applicable 13 |

X    THE Xᵀᴴ GRID REGION

FIG.5

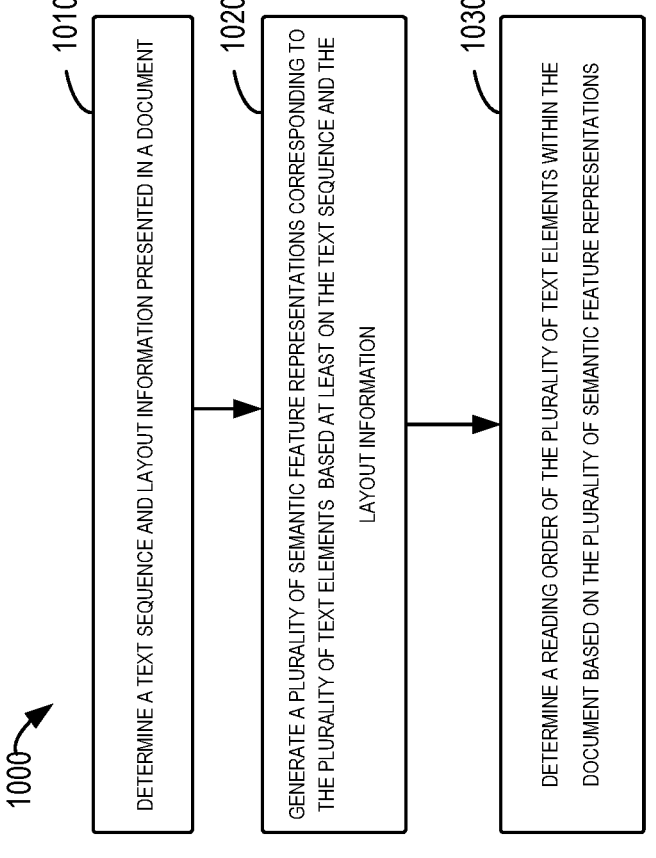

1010 DETERMINE A TEXT SEQUENCE AND LAYOUT INFORMATION PRESENTED IN A DOCUMENT

1020 GENERATE A PLURALITY OF SEMANTIC FEATURE REPRESENTATIONS CORRESPONDING TO THE PLURALITY OF TEXT ELEMENTS BASED AT LEAST ON THE TEXT SEQUENCE AND THE LAYOUT INFORMATION

1030 DETERMINE A READING ORDER OF THE PLURALITY OF TEXT ELEMENTS WITHIN THE DOCUMENT BASED ON THE PLURALITY OF SEMANTIC FEATURE REPRESENTATIONS

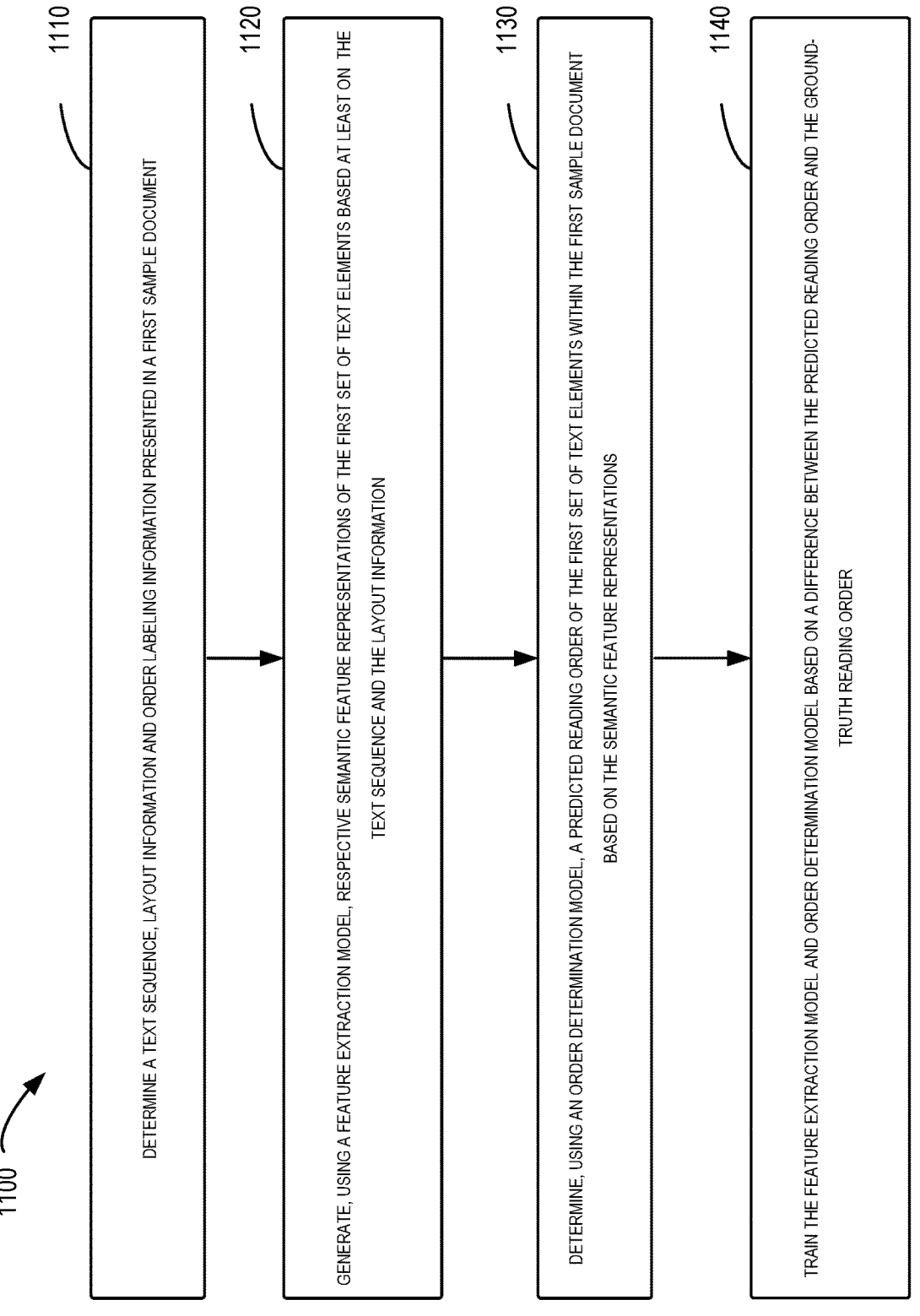

1100

1110 — DETERMINE A TEXT SEQUENCE, LAYOUT INFORMATION AND ORDER LABELING INFORMATION PRESENTED IN A FIRST SAMPLE DOCUMENT

1120 — GENERATE, USING A FEATURE EXTRACTION MODEL, RESPECTIVE SEMANTIC FEATURE REPRESENTATIONS OF THE FIRST SET OF TEXT ELEMENTS BASED AT LEAST ON THE TEXT SEQUENCE AND THE LAYOUT INFORMATION

1130 — DETERMINE, USING AN ORDER DETERMINATION MODEL, A PREDICTED READING ORDER OF THE FIRST SET OF TEXT ELEMENTS WITHIN THE FIRST SAMPLE DOCUMENT BASED ON THE SEMANTIC FEATURE REPRESENTATIONS

1140 — TRAIN THE FEATURE EXTRACTION MODEL AND ORDER DETERMINATION MODEL BASED ON A DIFFERENCE BETWEEN THE PREDICTED READING ORDER AND THE GROUND-TRUTH READING ORDER

FIG.11

READING ORDER DETECTION IN A DOCUMENT

CLAIM OF PRIORITY

This application is a U.S. National Stage Filing under 35 U.S.C. 371 of International Patent Application Serial No. PCT/US2022/030466, filed May 23, 2022, and published as WO 2023/278072 A1 on Jan. 5, 2023, which claims the benefit of priority to Chinese Patent Application No. 202110739466.3, filed Jun. 30, 2021, which applications and publication are incorporated herein by reference in their entirety.

BACKGROUND

Document understanding is a popular research field and intended to automatically read, understand and analyze a document. A document may include an electronically-generated document or scanned document, such as an image, an electronic file, a handwritten scanned document and so on. Understanding and analyzing a document, especially a business document, may greatly improve people's daily life and improve business efficiency and production. Rich-text documents might exist in many applications. As compared with plain-text documents, various types of information in rich-text documents are arranged in a more flexible format and layout, thereby having a rich visual presentation effect. Examples of rich-text documents include various forms, invoices, receipts, financial statements, advertising documents, etc. Although various types of documents contain different forms of information, part of the information is usually presented in a natural language. Therefore, document understanding involves natural language processing (NLP), especially learning a semantic feature representation of the textual information presented by the document.

In a specific application of document understanding, the reading order of a text sequence is an important task. The reading order describes the text sequence information that is naturally understood by human beings. However, it is challenging to determine the reading order in some documents, especially in rich-text documents.

SUMMARY

According to embodiments of the present disclosure, there is provided a solution for reading order detection in a document. In the solution, a computer-implemented method includes: determining a text sequence and layout information presented in a document, the text sequence comprising a plurality of text elements, the layout information indicating a spatial layout of the plurality of text elements in the document; generating a plurality of semantic feature representations corresponding to the plurality of text elements based at least on the text sequence and the layout information; and determining a reading order of the plurality of text elements in the document based on the plurality of semantic feature representations. According to the solution, the introduction of the layout information can better characterize a spatial layout manner of the text elements in a specific document, thereby determining the reading order more effectively and accurately.

The Summary is to introduce a selection of concepts in a simplified form that are further described below in the Detailed Description. The Summary is not intended to identify key features or essential features of the subject matter described herein, nor is intended to be used to limit the scope of the subject matter described herein.

BRIEF DESCRIPTION OF THE DRAWINGS

FIG. 2 illustrates an example document in accordance with some embodiments of the present disclosure;

FIG. 5 illustrates an example of labeling a text reading order in a document in accordance with some embodiments of the present disclosure;

FIG. 10 illustrates a flow chart of a process of reading order detection in accordance with some embodiments of the present disclosure;

FIG. 11 illustrates a flow chart of a process for model training in accordance with some embodiments of the present disclosure.

Throughout the drawings, the same or similar reference symbols refer to the same or similar elements.

DETAILED DESCRIPTION OF EMBODIMENTS

Figure 1:
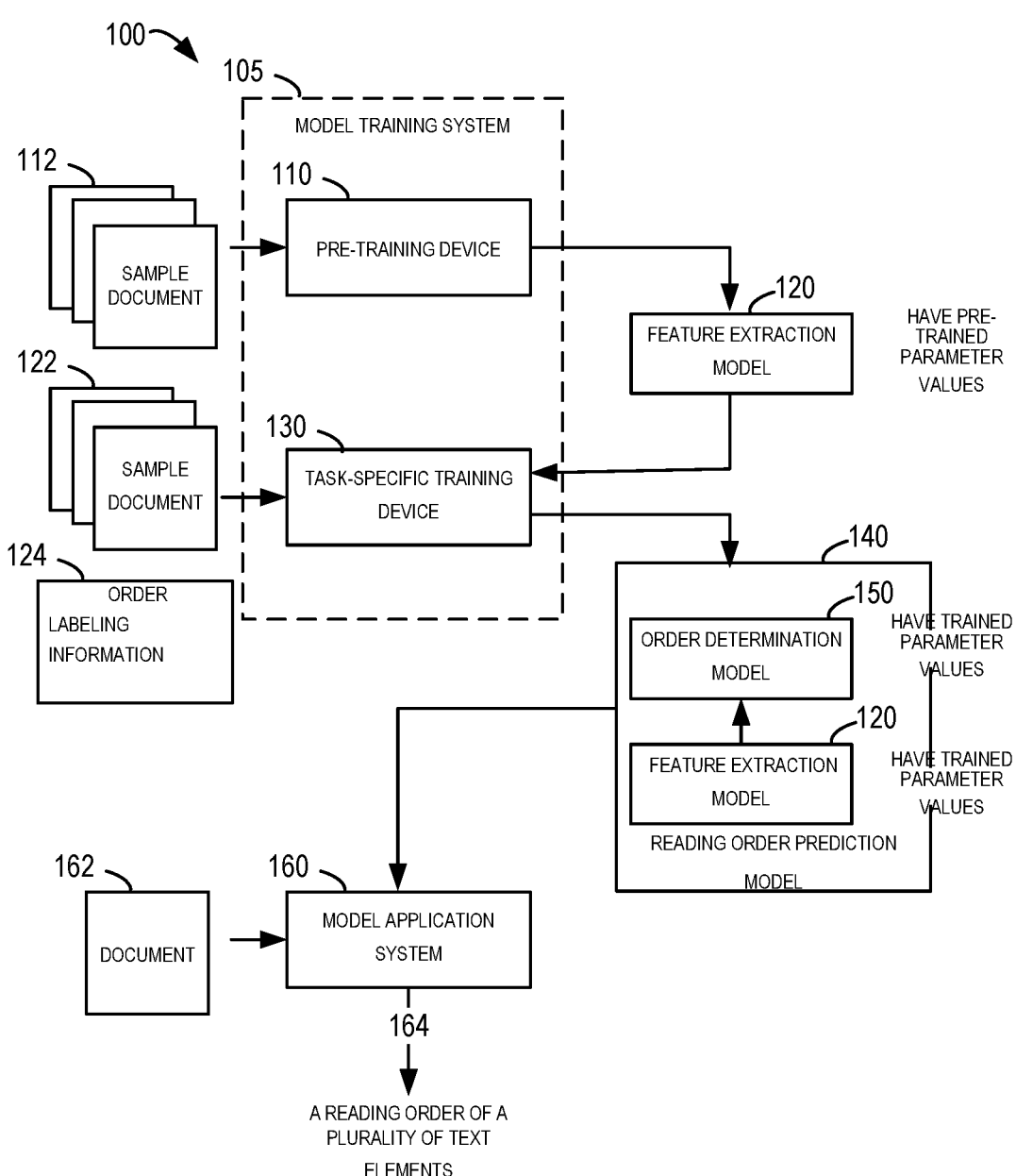
FIG. 1 illustrates a block diagram of an environment in which various embodiments of the present disclosure can be implemented.

Principles of the subject matter described herein will now be described with reference to some example implementations. It is to be understood that these implementations are described only for the purpose of illustration and help those skilled in the art to better understand and thus implement the subject matter described herein, without suggesting any limitations to the scope of the subject matter disclosed herein.

As used herein, the term "includes" and its variants are to be read as open terms that mean "includes, but is not limited to." The term "based on" is to be read as "based at least in part on."

The terms "an implementation" and "one implementation" are to be read as "at least one implementation." The term "another implementation" is to be read as "at least one other implementation." The terms "first," "second," and the like may refer to different or the same objects. Other definitions, either explicit or implicit, may be included below.

As used herein, the term "model" may refer to an association between corresponding input and output learnable from training data, and thus a corresponding output may be generated for a given input after the training. The generation of the model may be based on machine learning techniques. Deep learning is one of machine learning algorithms that processes the input and provides the corresponding output using a plurality of layers of processing units. A neural network model is an example of a deep learning-based model. As used herein, "model" may also be referred to as "machine learning model", "learning model", "machine learning network" or "learning network", which terms are used interchangeably herein.

A "neural network" is a machine learning network based on deep learning. The neural network can process an input to provide a corresponding output, and usually includes an input layer, an output layer, and one or more hidden layers between the input layer and the output layer. The neural network used in deep learning applications usually includes a large number of hidden layers, thereby increasing the depth of the network. The layers of the neural network are connected in order, so that the output of a preceding layer is provided as the input of a next layer, where the input layer receives the input of the neural network, and the output of the output layer is regarded as a final output of the neural network. Each layer of the neural network includes one or more nodes (also referred to as processing nodes or neurons), each of which processes input from the preceding layer.

Generally, machine learning may include three phases, i.e., a training phase, a test phase, and an application phase (also referred to as an interference phase). In the training phase, a given model may be trained using a great amount of training data, with parameter values being iteratively updated until the model can obtain, from the training data, consistent interference that meets an expected target. Through the training, the model may be considered as being capable of learning the association between input and the output (also referred to as input-to-output mapping) from the training data. The parameter values of the trained model are determined. In the test phase, a test input is applied to the trained model to test whether the model can provide a correct output, so as to determine the performance of the model. In the application phase, the model may be used to process an ground-truth input based on the parameter values obtained in the training and to determine the corresponding output.

Example Environment

FIG. 1 illustrates a block diagram of an embodiment 100 in which various embodiments of the present disclosure can be implemented. In the environment 100 of FIG. 1, it is desirable to train such a machine learning model so that the model can be used to detect a reading order of text elements in a document.

As shown in FIG. 1, the environment 100 includes a model training system 110 and a model application system 120. In some applications, a model training task may include a pre-training phase and a task-specific training phase. Therefore, the model training system 110 may include a pre-training device 110 and a task-specific training device 130.

The pre-training device 110 is configured to provide a pre-trained feature extraction model 120 through a pre-training technique, and the feature extraction model 120 is configured to at least extract a semantic feature representation of a text element from a document. A sample document set 112 is used to train the feature extraction model 120. After the pre-training process, the feature extraction model 120 has a pre-trained parameter value. The semantic feature representation extracted by the pre-trained feature extraction model 120 can be universally used for downstream tasks of various document understanding.

In some implementations, for a more specific document understanding task, the feature extraction model 120 may be further trained to continue to update the parameter value given in the pre-training phase, so that the semantic feature representation extracted by the feature extraction model 120 can be more accurately applied to a specific document understanding task. In FIG. 1, the task-specific training device 130 is configured to use the pre-trained feature extraction model 120 to perform training for the specific document understanding task.

In the example implementation of FIG. 1 and some example implementations that will be described below, the document understanding task includes a reading order detection task. The task-specific training device 130 is configured to train the reading order detection model 140, which is composed of two parts, including a feature extraction model 120 and an order determination model 150. The order determination model 150 is configured to determine the reading order of the text elements based on the semantic feature representation of the text element generated by the feature extraction model 120.

The training data used for the reading order detection model 140 includes a sample document set 122 and order labeling information 124. The order labeling information 124 is used to indicate ground-truth reading order of the text elements in sample documents. After the training process, the pre-training parameter value of the feature extraction model 120 is further updated and fine-tuned. After the training is completed, the feature extraction model 120 and the order determination model 150 both have the trained parameter value. Based on such a parameter value, the feature extraction model 120 and the order determination model 150 can be used together to achieve the reading order detection task.

In FIG. 1, the model application system 120 is configured to determine the reading order 164 of a plurality of text elements in a document 162. The model application system 120 may be configured to use the reading order detection model 140 to perform the determination of the reading order.

In the text herein, "document" refers to an object that partially or fully presents a text in a natural language. Some documents may include images from which text strings may be recognized. An image-format document for example may be a handwritten, printed or scanned document, or a digitally-captured image. Other examples of the documents may include digitally-generated documents, such as text files, PDF files, Extensible Markup Language (XML) files, or other structured or semi-structured documents, and other documents from which text strings can be extracted.

In the text therein, "text element" refers to a unit processed in an NLP task, and its granularity may be changed and set according to applications. For example, the text element may include a word, a phrase, a symbol, a combination of the foregoing, or any other elements that appear in a natural language expression. In some examples, the text element is also referred to as a token.

In the text herein, "semantic feature representation", also referred to as a semantic representation, a semantic feature, a semantic embedding representation, etc., is used to ensure or encode an intuitive meaning or semantics of the text element in a text sequence. In the text herein, "feature representation" (including a semantic feature representation or other feature representation) and "embedding representation" may be in the form of multidimensional vectors.

In FIG. 1, the model training system 110 and the model application system 120 may be any system with computing capabilities. It should be appreciated that the components and arrangements in the environment shown in FIG. 1 are only examples, and a computing system suitable for implementing the example implementation described in the subject matter described herein may include one or more different components, other components, and/or different arrangement manners. For example, although shown as separate, the model training system 110 and the model application system 120 may be integrated in the same system or device. The embodiments of the present disclosure are not limited in this respect.

The following will introduce the application of the trained model in reading order detection, the training of the model, and various example implementations of pre-training.

Example Implementation of Reading Order Detection

The reading order can describe a readable and understandable sorting manner of text elements in a document. The reading order is an important aspect of document understanding. When document processing and analysis are performed, many text elements presented in the document are often converted into a form of a sequence. However, traditional solutions all adopt a fixed reading order strategy, that is, simply arrange the text elements recognized from the document in a sequence from top to bottom and from left to right. In many cases, such a strategy cannot correctly represent a ground-truth reading order of the text elements in the document by a human being. Especially in a rich-text document, the placement and layout of text elements are more flexible, and the text elements will be organized with other similar content (such as images, icons, etc.), so the reading order of the text elements might not simply follow the order from top to bottom and from left to right.

FIG. 2 shows an example document 200 in accordance with some embodiments of the present disclosure. The document 200 is a table image in which text elements are organized as required by the layout of the table. The document processing task might require the recognition of text elements from the document 200, such as recognizing the document through an optical character recognition (OCR) technique. Upon recognizing a text, the OCR technique recognizes a line of words from top to bottom in the document 200 according to the division of text lines. According to the default reading order strategy from top to bottom and left to right, the text elements in each text line will be considered to be sorted from left to right. For example, the OCR technique will recognize the text sequence "MAC, if No change" in the box 210, and the text elements in these text sequences will be considered to be arranged in order from left to right upon reading.

However, due to the table organization manner of the document 200, the correct reading order is to arrange "MAC, if" and other text elements in box 220 in an order from top to bottom and from left to right, and arrange the text element "No change" after all text elements in box 200. In other words, upon reading the document 200, the correct reading order of a human being is often to sequentially read "MAC, if accessible development where not listed in this table" in the first column of the table, and then read "No change" in a second column in the same row, then read "Kangaroo Point south neighborhood plan code" in a third column of the same row.

Scenarios in which the default reading order from top to bottom and from left to right might lead to errors further include other documents such as forms, receipts and invoices having a multi-column arrangement, a flyer with text elements being arranged freely, and so on. The incorrect reading order might result in reduced accuracy or increased complexity of subsequent processing tasks. For example, if a key-value pair is extracted from a receipt or an invoice, the incorrect reading order might cause wrong information extraction.

Therefore, it is desirable to provide a solution for automatic, accurate and adaptive reading order detection. Some example embodiments of the present disclosure propose such a solution for reading order detection. According to this solution, machine learning technology is used to determine the reading order of text elements from the text elements themselves in the text sequence of the document and the layout information of these text elements in the document. As compared with simply determining the reading order from the text itself, the introduction of layout information can better characterize a spatial layout manner of text elements in a specific document, thereby determining the reading order more effectively and accurately.

Hereinafter, an example implementation of recognizing text from an image will be described in detail with reference to the accompanying drawings.

Figure 3:
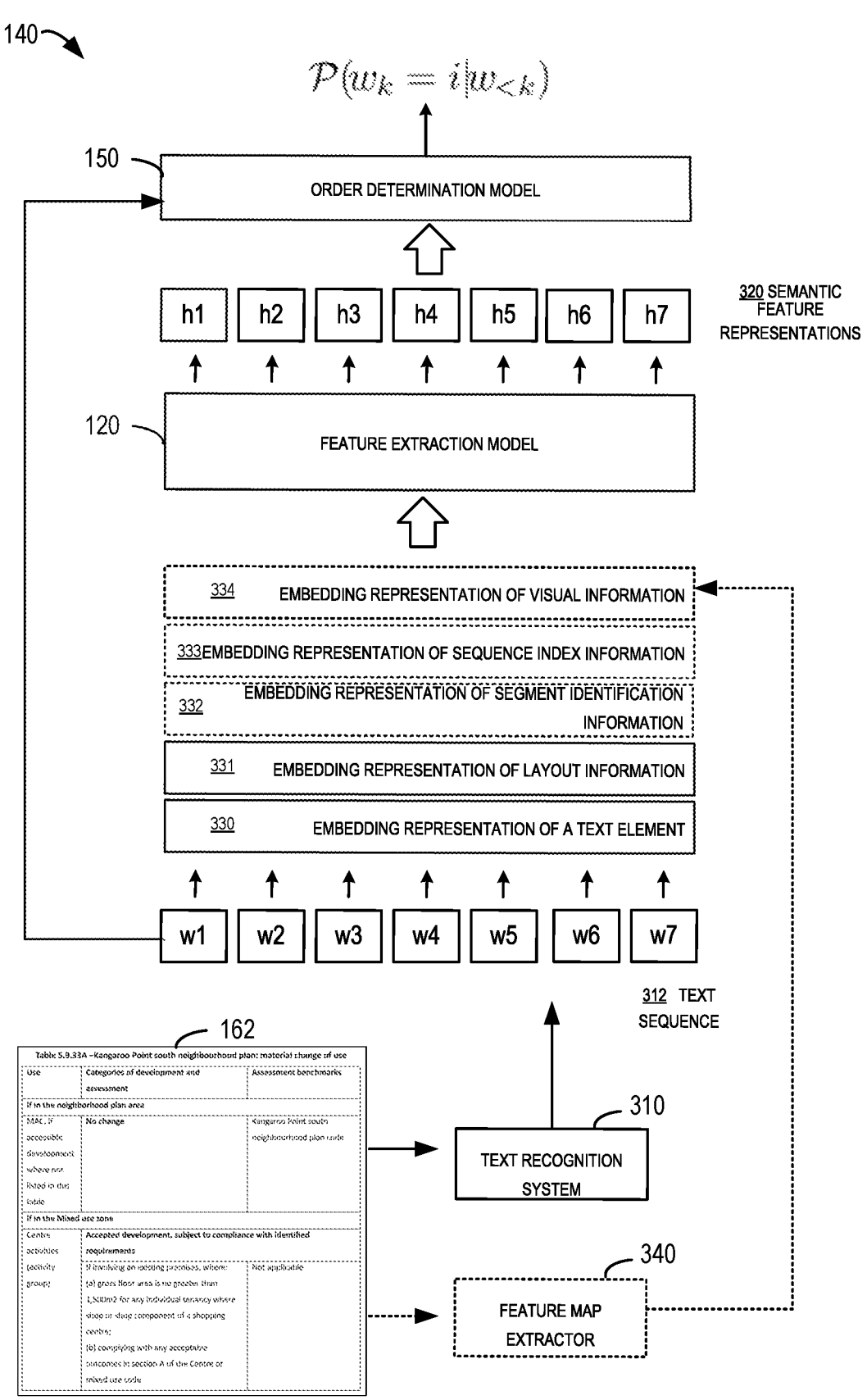
FIG. 3 illustrates a block diagram of a model architecture for reading order detection in accordance with some embodiments of the present disclosure.

FIG. 3 illustrates a block diagram of model architecture for reading order detection in accordance with some embodiments of the present disclosure. The architecture includes the reading order detection model 140 shown in FIG. 1, which includes the feature extraction model 120 and the order determination model 150. The detection of reading order detection model may be implemented by the model application system 120.

As shown in FIG. 3, the reading order of a plurality of text elements in the text sequence presented by the document 162 is to be detected. It is noted that the document shown here is only an example, and not considered as any restriction on the content and type of the document. In some implementations, a text sequence 312 which includes a plurality of text elements may be extracted from the document 162 by a text recognition system 310.

Depending on the type of the document 162, a corresponding text recognition technique may be used to extract the text sequence 312. For example, if the document 162 is an image-format file, the OCR technique may be used to extract the text sequence 312. If the document 162 is a PDF file, a PDF parsing tool may be used to extract the text sequence 312.

The number of text elements in the text sequence 312 may be arbitrary, and the text sequence 312 may include text elements in the document 162 whose order is expected to be determined. In some implementations, the feature extraction model 120 may be configured to extract features from a maximum number L of text elements. If the number of text elements in the text sequence 312 is less than L, a predetermined filler symbol, such as [PAD], may be added to meet the requirement for the maximum number. In some implementations, a start symbol, such as [CLS], may also be added at the beginning of the text sequence 312. In some implementations, if the filler symbol is added, a separation symbol, such as [SEP], may also be used to separate the text elements from the filler symbol. In this way, the input sequence S provided to the feature extraction model 120 may be represented as follows:

$$S = \{[CLS], w_1, w_2, \dots, [SEP], [PAD], [PAD], \dots\}, |S| = L \quad (1)$$

where $w_i$ represents the $i^{th}$ text element extracted from the document 162, and each text element or symbol in the input sequence S may be referred to as an input token. It should be appreciated that only an example of constructing the input sequence Sis given above. In other implementations, the aforementioned predetermined symbols may not be added. It is noted that although the text elements $w_1$ to $w_7$ are shown in FIG. 2, there may be more or fewer text elements according to ground-truth applications.

In some implementations, an embedding representation 330 of the text element may be determined. The embedding representation may characterize the text element in the form of a vector. The embedding representations of different text elements are different. The embedding representation 330 may be searched for from a pre-built text element-embedding representation mapping table, or the embedding representation of the text element may be obtained through other embedding representation generation models. As compared with the semantic feature representation to be extracted by the feature extraction model 120, although both are representations in the form of vectors, the embedding representation of the text element may only be used to distinguish the text element, whereas the semantic feature representation may better characterize accurate semantics of the text element in the context of the document 162. In some implementations, if the input sequence S is constructed by adding predetermined symbols such as [CLS], [SEP], and [PAD], these predetermined symbols may also have corresponding embedding representations.

In the embodiments of the present disclosure, in addition to the text sequence itself, layout information of the document 162 is also determined to help determine the reading order of text elements. The layout information indicates a spatial layout of the text elements in the text sequence in the document 162. For example, the layout information may include relative spatial positions of the plurality of text elements in the document 162, and in some cases, may also include the size of the text elements in the document 162. For example, for a given text element, a bounding box that may define the text element may be determined from the document 162. The position coordinates of the vertices of the bounding box in the two-dimensional (2D) space of the document 162 may be used to represent the relative spatial positions of the text element, and the size of the bounding box may be used to represent the size of the text element.

As an example, the layout information of the $i^{th}$ text element may be represented as $(x_0, x_1, y_0, y_1, w, h)$, where (x0, y0) represents x-axis and y-axis coordinates of the upper left (right) corner of the bounding box of the text element, (x1, y1) represents x-axis and y-axis coordinates of the lower right (left) corner of the bounding box, and w and h represent a width and height of the bounding box, respectively.

Certainly, in other examples, the layout information of the text element may also be characterized in other ways, for example, the relative spatial position may be represented with a center point of the bounding box, and the size may be represented with an area of the boundary box, and so on. The layout information is not limited in the text herein, as long as it can be ensured that any alternative or additional information of different text elements in the two-dimensional space of the document 162 all may be used. The layout information may also be converted into an embedding representation 331 in the form of a vector for input to the feature extraction model 120. In some implementations, the text element in the text sequence 312 may further be assigned segment identification information to indicate which segment of two or more predetermined segments the text element belongs to. The embedding representation 332 of the assigned segment identification information is also taken as part of the input of the feature extraction model 120. For example, each text element in the text sequence may be assigned with segment identification information $s_i \in \{[A], [B]\}$, where [A] and [B] correspond to different segments, respectively. In some implementations, different segments may indicate different types of text elements.

In some implementations, the text elements in the text sequence 312 may also have respective sequence index information, which is to indicate sequential positions in the text sequence 312. Different from the two-dimensional relative spatial positions of the document 162 indicated by the layout information, the sequence index information is used to indicate a relative position of the text element in a one-dimensional text sequence 312, and therefore may also be regarded as one-dimensional position information. It is possible to assign corresponding sequence index information to each text element in order from a starting text element of the text sequence 312. In some implementations, if the input sequence S shown in the above Equation (1) is constructed, each text element or symbol in the sequence may have corresponding sequence index information. Therefore, for the text sequence 312, the input embedding representation that may be constructed accordingly includes the embedding representation 330 of the text element, the embedding representation 332 of the segment identification information and the embedding representation 333 of sequence index information. For each text element, the constructed embedding representation may be represented as follows:

$$t_i = TokEmb(w_i) + PosEmb1D(i) + SegEmb(s_i), 0 \le i < L \qquad (2)$$

where $TokEmb(w_i)$ represents the embedding representation of the $i^{th}$ text element $w_i$, $PosEab1D(i)$ represents the embedding representation of the sequence index information of the text element $w_i$, and $SegEmb(s_i)$ represents the embedding representation of the segment identification information of the text element $w_i$. It should be appreciated that the above are only examples. In other implementations, the embedding representations of sequence index information and/or segment identification information may be ignored.

In some implementations, in addition to the layout information, to enable the feature extraction model 120 to extract more accurate semantic feature representations for determining the reading order of text elements, visual information related to the document 162 may also be determined and provided as the input of the feature extraction model 120. In some implementations, the visual information may indicate visual appearances of respective text elements presented in the document 162. The visual information may also be characterized by a feature representation of vector information, as the input of the feature extraction model 120.

In some examples, a feature map extractor 320 may be used to extract the embedding representation 334 of visual information. In some implementations, if the document 162 is an image-format file, it may be directly used as the input of the feature map extractor 320. If the document 162 is not an image-format file, the document 162 may be converted into an image-format file as the input of the feature map extractor 320. The feature map extractor 320 may include a machine learning model configured to be adapted to process images, for example a convolutional neural network CNN, etc., to extract one or more feature maps from the image-format file to represent the visual information.

In some implementations, after the feature map is extracted from the feature extractor 320, the feature map may be pooled, e.g., be subjected to an average pooling operation, to obtain a feature map identical with the dimensions (e.g., width W and height H) of the document 162. Since the feature map is in a two-dimensional form, the feature map may be flattened into a one-dimensional visual embedding representation sequence, e.g., a visual embedding representation sequence with a total length of W*H, to provide the embedding representation 334 as visual information. For example, the sequence may include a plurality of visual embedding representations, and each visual embedding representation may correspond to the feature information of a portion of the feature map. Since the two-dimensional space of the feature map corresponds to the two-dimensional space of the document 162, the feature information of this portion may also correspond to the feature information in the document 162. In some implementations, the visual embedding representation may also be processed through a linear mapping layer to unify the dimensions.

Figure 4:
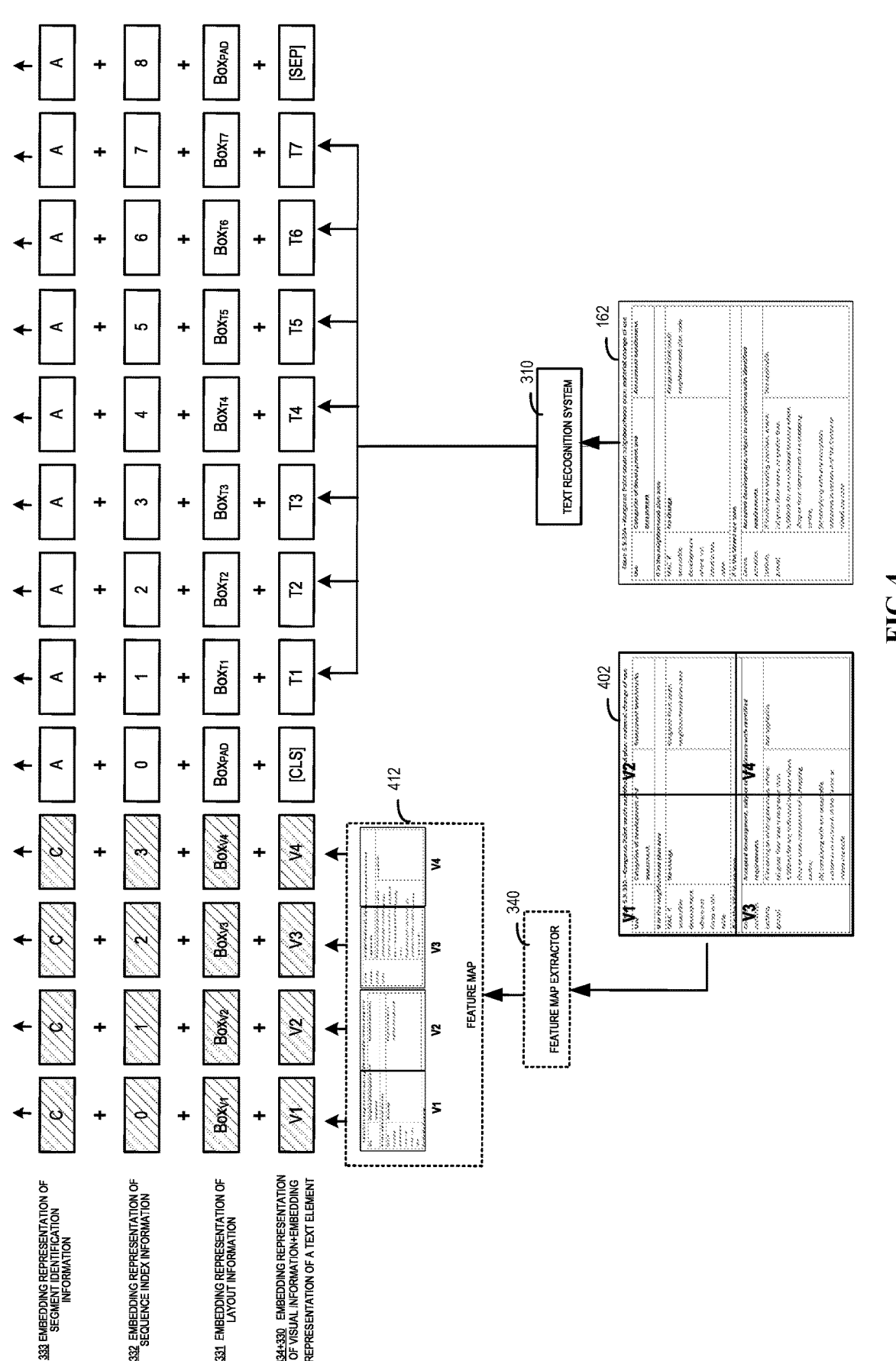
FIG. 4 illustrates an example of an input embedding representation of a feature extraction model in accordance with some embodiments of the present disclosure.

For better understanding, FIG. 4 illustrates examples of various types of embedding representations. As shown in FIG. 4, after the feature extractor 340 extracts the feature map 412 from the image-format file 402 corresponding to the document 162, the feature map 412 is flattened into four visual embedding representations, which may respectively correspond to four portions V1 to V4 in the image-format file 402 to characterize visual features of these four portions, respectively. The four visual embedding representations may form a one-dimensional visual embedding representation sequence to serve as the embedding representation 334 of the visual information. In some implementations, similar to the text element, sequence index information and segment identification information of the visual embedding representation may also be considered. Correspondingly, for the $i^{th}$ visual embedding representation 334, the constructed embedding representation includes the following content:

$$v_i = Proj(VisTokEmb(I)_i) + PosEmb1D(i) + SegEmb([C]), \ 0 \le i < WH \quad (3)$$

where $VisTokEmb(I)_i$ represents the $i^{th}$ embedding representation 334 of the visual information obtained from the change of the feature map. $PosEmb1D(i)$ represents the embedding representation corresponding to the sequence index information of the $i^{th}$ visual embedding representation. If the feature map is divided into M visual embedding representations, the value of i may be in a range of 1 to M. $SegEmb([C])$ represents the embedding representation of segment identification information. Each visual embedding representation may be assigned as a segment of a visual type, such as [C], the segment type being different from the segment type of the text element.

In some implementations, for each visual embedding representation, the embedding representation of the layout information may also be determined. The embedding representation of the layout information may be represented by relative spatial positions and sizes of each visual embedding representation in corresponding portions (V1 to V4 portions in FIG. 4) in the document 162 or image-format file 402, in a representation manner similar to the embedding representation of the layout information of the text elements.

In some examples, in a case where the layout information of the text element and the visual embedding representation is considered at the same time, the embedding representation 331 of the layout information may be represented as follows:

$$l_i = \quad (4)$$
$$Concat(PosEmb2D_x(x_0, x_1, w), PosEmb2D_y(y_0, y_1, h)), \ 0 \le i < WH + L$$

where W and H represent a total width and a total height of the document 162, and L represents a length of the input sequence S corresponding to the text element. In the above Equation (4), the x-axis coordinate information (x0, x1) and width w are used as a triple to construct an embedding representation, and the y-axis coordinate information (y0, y1) and height h are used as a triple to construct another embedding representation, and then the two embedding representations are concatenated into the embedding representation of the layout information of the $i^{th}$ text element. It should be appreciated that the layout information of the text element may also be converted into the corresponding embedding representation in other ways, as long as the determined embedding representation may distinguish different layout information. In some implementations, if the input sequence Sis constructed by adding predetermined symbols such as [CLS], [SEP] and [PAD], the embedding representation of the layout information corresponding to these predetermined symbols may be determined as an all-zero vector, for example (0, 0, 0, 0, 0, 0).

In some implementations, considering the above-mentioned types of embedding representations, the embedding representation $\{t_0, \ldots, t_{L-1}\}$ (determined by the above Equation (2)) constructed for text elements and the embedding representation $\{v_0, \ldots, v_{WH-1}\}$ (determined by the above Equation (3)) constructed for visual information may be concatenated into a unified sequence X, and then the sequence X is combined with the embedding representation 331 of the layout information, thereby obtaining an input embedding representation $x^{(0)}$ of the feature extraction model 120. The determination of the input embedding representation $x^{(0)}$ may be represented as follows:

$$x_i^{(0)} = X_i + 1_i, \text{ where } X = \{v_0, \ldots, v_{WH-1}, t_0, \ldots, t_{L-1}\} \quad (5)$$

For better understanding, FIG. 4 illustrates how these different and similar embedding information is combined into the input embedding representation $x^{(0)}$ of the feature extraction model 120. As shown in FIG. 4, the visual embedding representation 334 (represented by V1 to V4) and the embedding representation 331 of the text element (represented by [CLS], T1 to T6, and [SEP]) are concatenated. In addition, for each text element and each visual embedding representation, there exist a corresponding embedding representation 331 of the layout information and a corresponding embedding representation 332 of the index sequence information. These embedding representations may be summed up as per text elements and as per visual embedding representations, to form a final input embedding representation $x^{(0)}$.

The above shows an example of the input when the feature extraction model 120 performs feature extraction. It should be appreciated that in different implementations, one or more of the abovementioned visual information, sequence index information and segment identification information may be omitted.

The feature extraction model 120 is configured to determine the semantic feature representations corresponding to respective text elements in the text sequence 312 based on the input embedding representations. For example, for the text elements $w_1$ to $w_7$ shown in FIG. 2, the semantic feature representations $h_1$ to $h_7$ of respective text elements may be determined.

In some implementations, the feature extraction model 120 may determine the semantic representation based on a self-attention mechanism. According to the self-attention mechanism, an importance degree of each text element to other text elements may be determined. In this way, when the semantic feature representation of a certain text element is extracted, more attention is paid to an important text element, and less attention is paid to an unimportant text element.

In some implementations, an attention weight $\alpha_{ij}$ of the text element i with respect to the text element j in the text sequence 310 may be determined based on the embedding representations of the two text elements. In some implementations, the subject matter described herein further proposes a spatially perceptible self-attention mechanism, which determines the attention weight with the spatial position relationship of the text element. Specifically, the attention weight of one text element with respect to another text element may be determined based on the relative spatial positions of the two text elements in the document 162. This relative spatial positions includes the spatial positions (x0, y0) and (x1, y1) discussed above regarding the layout information. In some implementations, upon determining the attention weight, the coordinates of a point in the bounding box may be considered, for example (x0, y0) or (x1, y1). The relative spatial positions here may characterize the relative positioning relationship of two text elements in the two-dimensional space of the document 162. Alternatively or additionally, this may also be represented based on relative ranking positions of the two text elements in the text sequence 310, e.g., represented by sequence ranking indices of the two text elements. The relative ranking positions may characterize the relative positioning relationship of the two text elements in the one-dimensional space of the text sequence 310.

With the position information being taken into consideration, the relative spatial positions and relative ranking positions of the text element i and the text element j may be used to determine an offset for adjusting a basic attention weight $\alpha_{ij}$ determined based on the embedding representations of the two text elements i and j. A process of determining the offset from the relative spatial positions and the relative ranking positions may be a training process to learn corresponding parameter values for determining an accurate offset of different relative spatial positions and relative ranking positions.

The attention weights of text element i to text element j may be determined as follows:

$$\alpha'_{ij} = \alpha_{ij} + b^{(1D)}_{j-i} + b^{(2D_x)}_{x_j-x_i} + b^{(2D_y)}_{y_j-y_i} \qquad (6)$$

where $\alpha_{ij}$ represents the basic attention weight determined based on the embedding representations of the two text elements i and j, $$b^{(2D_x)}_{x_i-x_i}$$

represents the offset determined based on the coordinate information of the x-axis in the relative spatial positions of the text element i and the text element j, $b^{(2D_y)}_{y_i-y_i}$ represents an offset determined based on the coordinate information of the y-axis in the relative spatial positions of the text element i and the text element j, and $$b^{(1D)}_{j-i}$$

represents the offset determined based on the relative ranking positions.

For a given text element in the text sequence 310, the attention weight of the given text element with respect to another text element may be determined. The attention weight may be used to weight the embedding representation of another text element to determine the semantic feature representation of the given text element. This may be represented as follows:

$$h_i = \sum_j \frac{\exp(\alpha'_{ij})}{\sum_k \exp(\alpha'_{ik})} x_j W^V \qquad (7)$$

where $h_i$ represents the semantic feature representation of the text element i, $x_j$ represents the embedding representation of the $j^{th}$ text element, and $W^V$ represents the parameter value of the model.

In some implementations, the feature extraction model 120 may include a plurality of network layers, such as Transformer network layers. An attention head in each network layer or each transformer network layer may use the self-attention mechanism to process the input of the network layer and output an output of the network layer. At each network layer, the attention weight $\alpha_{ij}'$ may be determined based on the above Equations (5) and (6). In such an implementation, the basic attention weight $\alpha_{ij}$ is determined based on the input embedding representation for text element i and text element j in the network layer (for the first network layer) or an intermediate feature representation output by a previous network layer. In addition, in the above Equation (6), $x_j$ represents the input embedding representation of the $j^{th}$ text element (for the first network layer) or the intermediate feature representation output by the previous network layer.

The semantic feature representations of text elements (for example, $h_1$ to $h_7$ shown in FIG. 3) may be provided to the order determination model 150 for determining the reading order of the plurality of text elements in the document 162. In some implementations, a reading order index of each text element may be determined. For example, if there are a total of N text elements, the reading order index performs indexing from 1 to N to indicate the reading order of these text elements.

In some implementations, the feature extraction model 120 and the order determination model 150 may be based on a sequence-to-sequence (seq2seq) model architecture. The order determination model 150 may sequentially determine the reading order index of each text element one by one starting from an initial text element of the text sequence 310.

In some implementations, the feature extraction model 120 may be based on a Transformer network configuration, a BERT network configuration, or any other suitable machine learning or neural network configuration. The embodiments of the present disclosure are not limited in this respect.

$$\mathcal{P}(w_k = i \mid w_{<k}) = \frac{\exp\!\left(e_i^T h_k + b_k\right)}{\sum_j \exp\!\left(e_j^T h_k + b_k\right)} \tag{8}$$

In the above Equation (8), $w_k$ represents the $k^{th}$ text element in the text sequence 312. In the above Equation (8), i represents the reading order index. For example, there are a total of N text elements, and the positions of the reading order may be indexed from 1 to N. In the above Equation (8), $\mathcal{P}(w_k=i \mid w_{<k})$ represents a probability that the text element $w_k$ has the reading order index i in the reading order in a case where the reading order indices of the text elements before the text element $w_k$ in the given text sequence 312 are known.

In addition, in the above Equation (1), $e_i$ and $e_j$ represents the embedding representations of the $i^{th}$ text element and the $j^{th}$ text element, $h_k$ represents the semantic feature representation output from the feature extraction model 120 in the $k^{th}$ step, and $b_k$ represents an offset value at the $k^{th}$ step. The feature determination model 140 sequentially determines starting from the first text element of the text sequence one by one, and in each step, judges the position of a text element in the reading order.

The reading order of each text element in the document may be determined through the reading order detection model. The information about the reading order of the text elements may also be used to guide more document understanding tasks for the document.

In some implementations, the reading order of regions in the document 162 may also be determined based on the reading order indices of the text elements. FIG. 5 illustrates an example of labeling a text reading order in the document 162 in accordance with some embodiments of the present disclosure. As shown in FIG. 5, it is desirable to mark the reading order of the respective regions, for example, the reading order of respective grid regions in the document 162. The text element presented in each grid region may be determined. The smallest reading order index among all reading order indexes of text elements in each grid region is determined as the order index of the grid region. Then, the order index of the plurality of grid regions in the document 162 may be ranked, and the reading order index of each grid region may be labeled in an ascending order. FIG. 5 shows the reading order index of each grid cell in numerical form. In some implementations, the labeling of the reading order in the document may also be presented to the user, or may be provided for other analysis tasks of the document. The embodiments of the present disclosure are not limited here. Implementation of the Training of the Reading Order Detection Model In order to train the reading order detection model 140 including the feature extraction model 120 and the order determination model 150, training data including the sample document set 122 and order labeling information 124 shown in FIG. 1 need to be obtained. In the training process, the parameter values of the feature extraction model 120 and the order determination model 150 may be initialized. In some implementations, the feature extraction model 120 may undergo a pre-training process, and thus have pre-trained parameter values as initial values.

Figure 6:
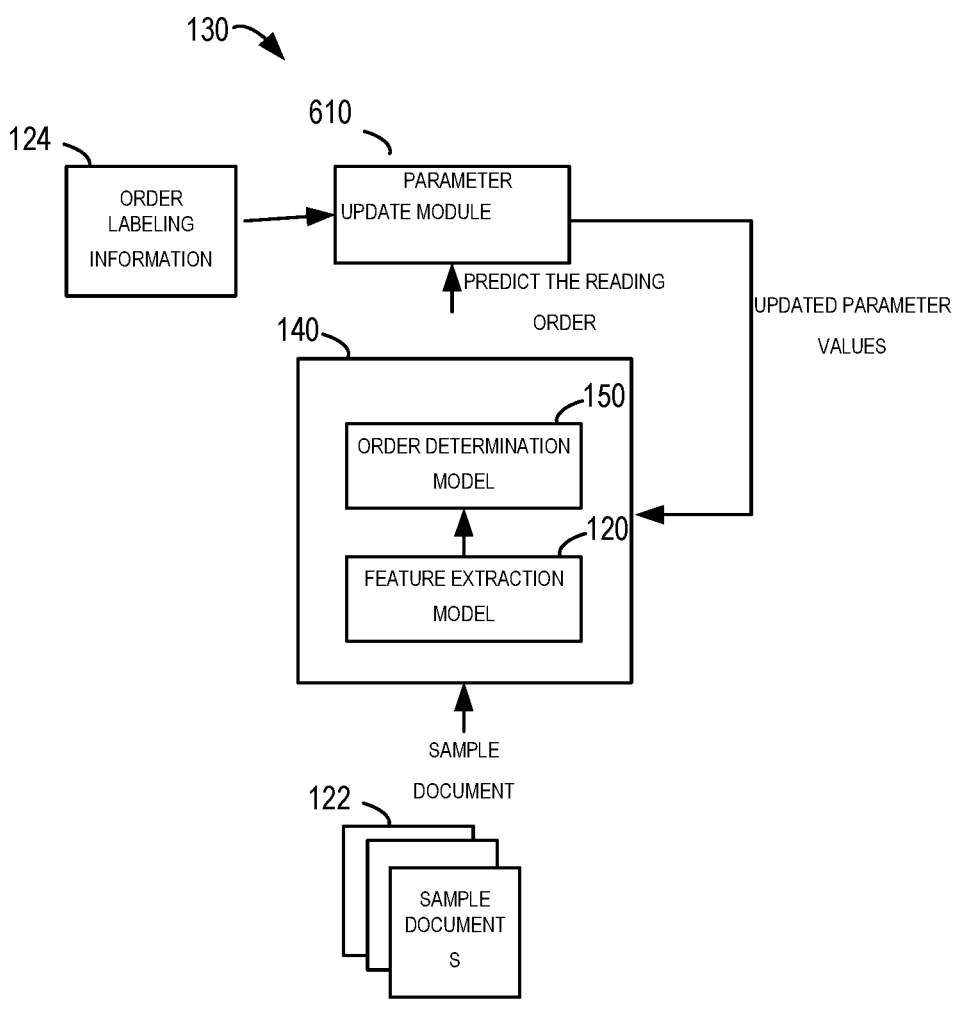
FIG. 6 illustrates an example architecture for training a reading order detection model in accordance with some embodiments of the present disclosure.

FIG. 6 illustrates an example architecture for training the reading order detection model in accordance with some embodiments of the present disclosure, which may be implemented in the task-specific training device 130.

In the training process, sample documents in the sample document set 122 will be provided as input. The feature extraction model 120 may extract a text sequence from the sample documents according to the processing procedure described above, determine the layout information, and determine the semantic feature representations of the text elements in the sample documents based on the text sequence and the layout information. At this time, the feature extraction model 120 may extract the semantic feature representations by using the current parameter values. Similarly, the order determination model 150, using its own current parameter values, determines a predicted reading order of text elements in the sample document based on the semantic feature representations extracted by the feature extraction model 120.

The task-specific training device 130 includes a parameter update module 610, which is configured to determine a ground-truth reading order of text elements in the currently-input sample document from the order labeling information 124, and determine how or whether to update the parameter values of the feature extraction model 120 and the order determination model 150 based on a difference between the predicted reading order and the ground-truth reading order. A purpose of upgrading the parameter values of the feature extraction model 120 and the order determination model 150 is to reduce the difference between the predicted reading order and the ground-truth reading order. The updated parameter values determined by the parameter update module 610 are configured to the feature extraction model 120 and the order determination model 150 for use in the next iteration. The parameter values of the model may be continuously determined in an iterative manner, so that the model can learn how to correctly detect the reading order of text elements, to achieve a convergence target.

Upon training with respect to the reading order detection task, the order labeling information about the text elements in the document needs to be used as the supervision information to guide the training of the model. Considering that the cost required for manual labeling of the order of the text elements in a large number of sample documents is too high, the embodiments of the subject matter described herein further propose a simple and efficient way to obtain order labeling information.

In some implementations, in the stage of collecting training data, editable text documents may be collected as sample documents, and such editable text documents may have corresponding format information for indicating the ground-truth reading order of text elements in the document. For example, for a Word document in ".docx" format, an Office XML (Extensible Markup Language) code may be read to obtain the ground-truth reading order of the text elements presented on each page in the document. Other document formats that can extract information about the reading order may also be applied.

Since the input of the feature extraction model 120 still needs to determine the layout information and possible visual information, the editable text document may be converted into a format suitable for extracting the layout information or visual information. In some implementations, in order to extract the layout information, a Word document in the ".docx" format may be converted into a vector file, and a relative spatial position and size of each text element may be located from the vector file. The vector file may usually be in a format with fixed content, so that the layout information may be extracted better. An example of the vector file includes a PDF (Portable Document Format) file, and a SVG (Scalable Vector Graphics) file.

For the page of a sample document, the input information $\{t_1, t_2, t_3, \ldots\}$ may be extracted, where $t_i$ includes the text element $w_i$ and the layout information of the text element, for example, the relative spatial position represented by the vertex coordinates $(x_0{}^i, y_0{}^i, x_1{}^i, y_1{}^i)$ of the bounding box, and possibly further include the size represented by the width and height of the bounding box. In some implementations, in order to extract visual information, a Word document in the ".docx" format may be converted into an image-format file as the input of the feature map extractor 340.

In some implementations, the same text may occur many times in a document. For example, a document with English texts may include texts such as "the" and "a" that occur at different positions. The same texts that occur at different positions are usually extracted as different text elements in the text sequence. Various format conversions of the sample document need to be performed to prepare the text sequence, the layout information and the visual information. In this process, different text elements need to be accurately distinguished so that the layout information, visual information, etc. can be aligned with the text elements.

In order to be able to distinguish text elements representing the same text, an index of occurrence order may be assigned to each text element in the text sequence. For example, if the text sequence extracted from the sample document is [the, car, hits, the, bus], then the index indicating the occurrence order may be determined as [0, 0, 0, 1, 0], where for the text element "the" occurring twice, the text element "the" at the first occurrence has an index 0 to indicate the first occurrence of "the", and the text element "the" at the second occurrence has an index 1 to indicate the first occurrence of "the".

Further, in the vector file corresponding to the sample document, a plurality of text elements representing the same text are labeled with different colors. In this way, when the layout information (for example, the relative spatial position and/or size of the text element) is determined from the vector file, which text element in the sample document corresponding to the layout information may be determined. In some implementations, an automated tool may be used to change the colors of the text element in the sample document in an editable format, and then the colored document may be converted into the vector file.

In some implementations, the color of each text element may be determined based on the index of the occurrence order of the text element. For example, all text elements in the sample document may be first changed to the same color, such as black. For a given text element, its color (taking the RGB color space as an example) may be determined as follows:

$$r = i \,\&\, 0 \times 110000 \qquad (9)$$

$$g = i \,\&\, 0 \times 001100$$

$$b = i \,\&\, 0 \times 000011$$

where i represents the index of the occurrence order of the text element, & represents a bitwise "and" operation, r, g and b represent color values determined for three color channels of RGB, and $\mathcal{C}$ represents a mapping function for mapping the determined color values to the corresponding RGB color channels.

Figure 7:
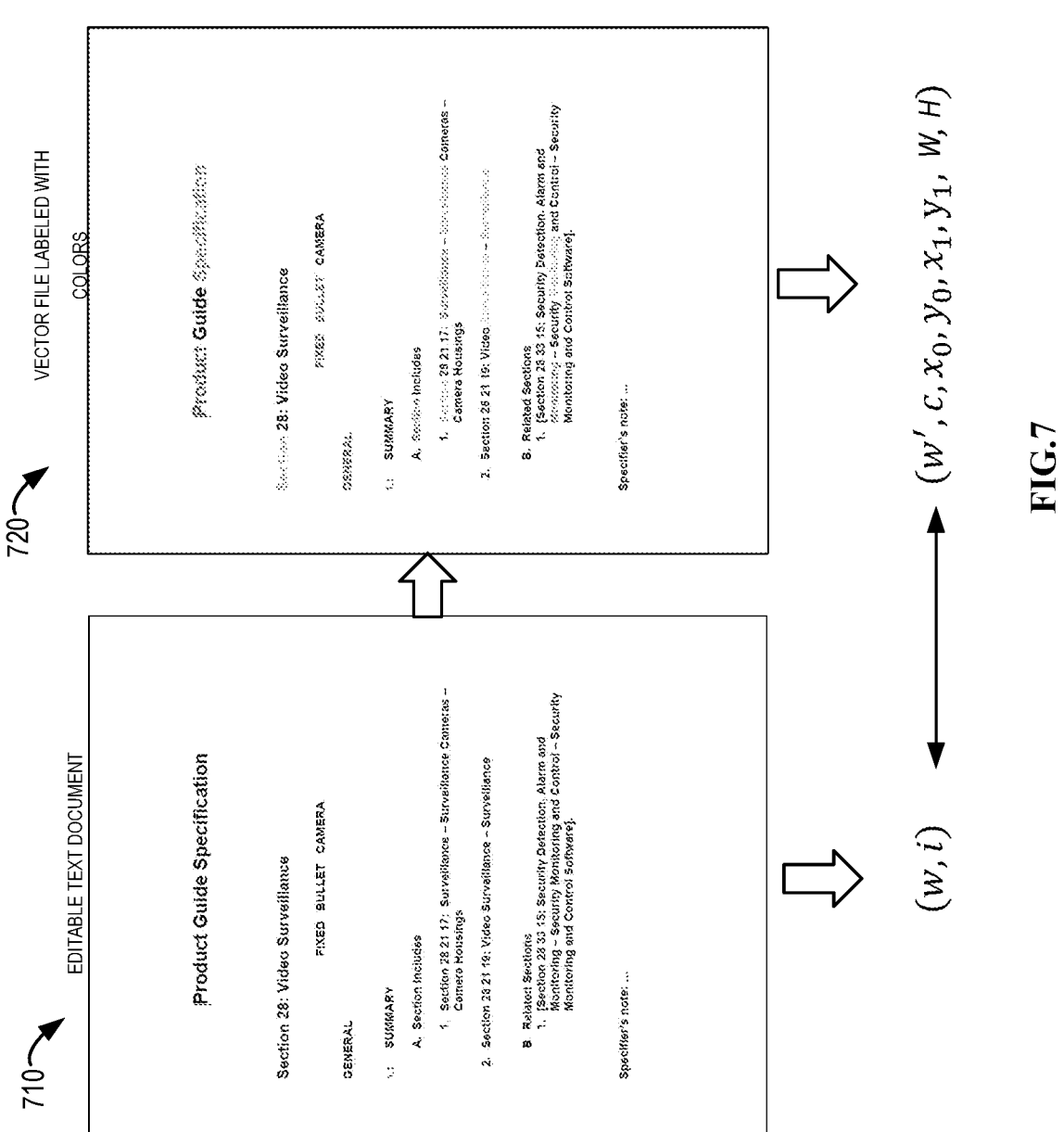
FIG. 7 illustrates an example of labeling a sample document upon training in accordance with some embodiments of the present disclosure.

Through the above index assignment and color labeling, for each sample document, the editable sample document and the corresponding vector file pair may be determined, and a mapping may be established for each text element, as shown in FIG. 7. A text sequence including a plurality of text elements is extracted from the editable text document 710, and in the corresponding vector file 720, the plurality of text elements representing the same text are labeled with different colors. As such, the mapping for each text element may be represented as:

$$(w, i) \leftrightarrow (w', c, x_0, y_0, x_1, y_1, W, H) \qquad (9)$$

$$\text{Where } w = w'; c = C(i)$$

In the above formula (9), (w,i) is the information that may be extracted from the editable text document 710, including the text w represented by the text element (for example, the word itself), and i represents the index of the occurrence order of the text w in the text sequence. In the above formula (9), $(w', c, x_0, y_0, x_1, y_1, W, H)$ is the information extracted from the vector file 720, including the text w' represented by the text element, the color c of the text element labeled in the document 720, the relative spatial position $x_0$, $y_0$, $x_1$, $y_1$ of the text element, and the total width W and height H of the document.

If it is found in the two documents 710 and 720 that two text elements represent the same text, that is, w=w', it is possible to determine corresponding colors according to the mapping function $\mathcal{C}$ (i) and the index i of the occurrence order of the text elements, thereby accurately determining a text element in the editable document 710 corresponds to which text element in the editable text document 720, and then regard the relative spatial position $x_0$, $y_0$ $_0$, $x_1$, $y_1$ determined in the editable text document 710 as the spatial position of the text file.

In the use of sequence-to-sequence (seq2seq) network configurations such as Transformer network configuration, self-attention mask should also be considered upon training. In some implementations, the self-attention mask may be determined in a way that text elements in an input source sequence may pay attention to one another, and attention is only paid to elements located on the left in an overall sequence composed of the source sequence and a target sequence, and attention is not paid to elements in the output target sequence. The self-attention mask may be represented as:

$$M_{i,j} = \begin{cases} 1, & \text{如果 } i < j \text{或 } i, j \in src \\ 0, & \text{否则} \end{cases} \qquad (10)$$

where src represents the input source sequence, i.e., the input text sequence 310. The target sequence includes the output sequence of the order determination model 150, i.e., a sequence indicating the reading order. In the above Equation (10), 1 indicates that the element i in the sequence is allowed to pay attention to the element j, and 0 indicates that the attention is not allowed. When the attention is not allowed, the another element j will not affect the judgment of element i.

Figure 8:
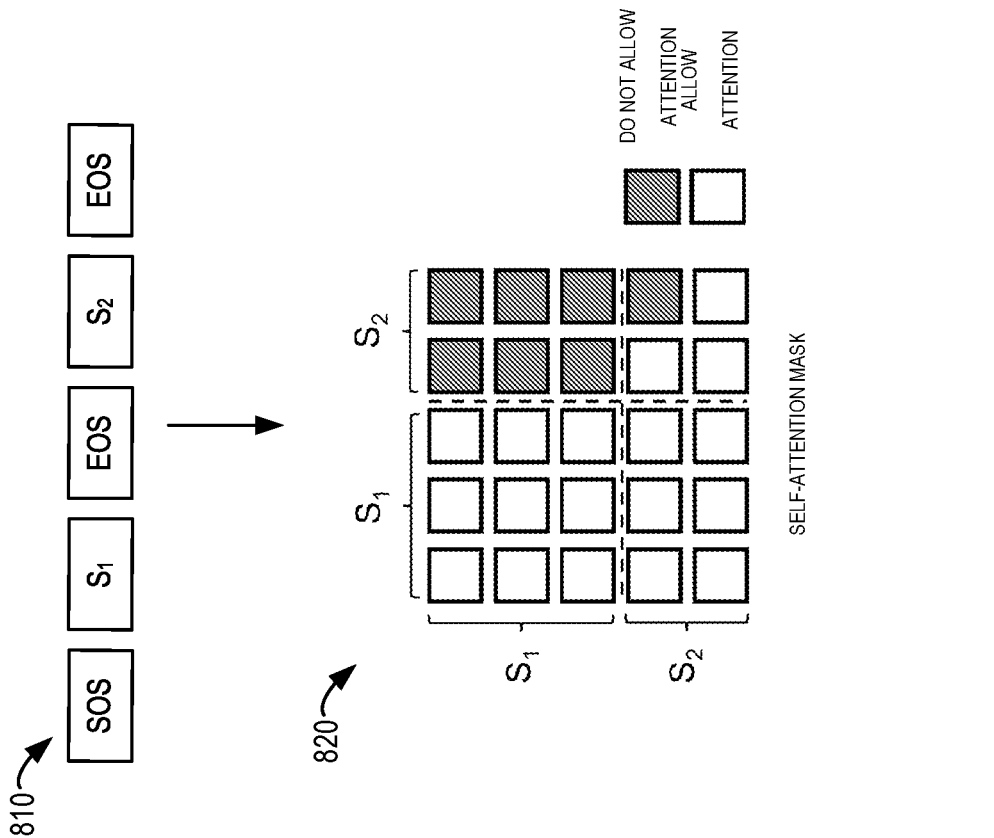
FIG. 8 illustrates an example of self-attention masking in accordance with some embodiments of the present disclosure.

As shown in FIG. 8, upon training, a sequence 810 is composed of [SOS]S1[EOS]S2[EOS], where S1 is the source sequence, S2 is the target sequence, [SOS] represents the target sequence, and [EOS] Indicates the end of a sequence. According to the above Equation (10), a self-attention mask 820 may be set. Upon training, the elements in the two sequences will be randomly masked. If one element in the source sequence is masked, the model may pay attention to all elements in the source sequence; if one element in the target sequence is masked, the model can only pay attention to current elements in the source sequence and the target sequence and other elements between the elements. The above self-attention mask is often used in the training of natural language models, so it will not be described in more detail any longer.

Implementation of Pre-Training of the Feature Extraction Model

As mentioned above, the feature extraction model 120 may be pre-trained to be capable of extracting semantic feature representations of text elements in a document. After the parameter values of the feature extraction model 120 are determined by the pre-training, the parameter values are further fine-tuned for a subsequent specific document under-standing task, such as the reading order detection task. After the pre-training and upon training with respect to a specific task, the parameter values of the feature extraction model 120 may converge to a target faster, thereby improving training efficiency.

In the pre-training stage, since there is no specific task, there is no definite supervision information regarding the task to guide the training. In some implementations, training is completed by setting some self-supervised tasks. This will be discussed in detail below.

Figure 9:
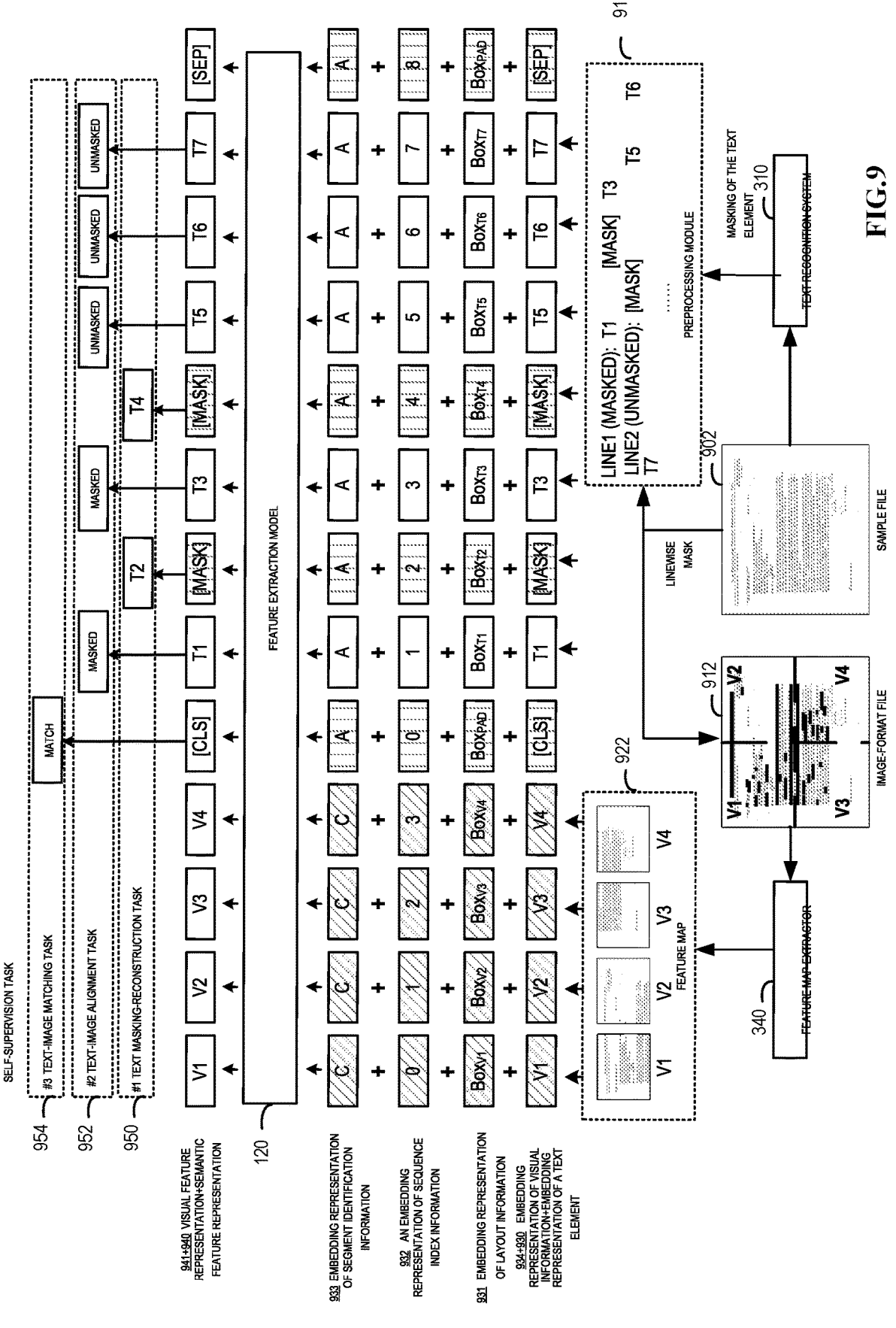
FIG. 9 illustrates an example architecture of pre-training of the feature extraction model in accordance with some embodiments of the present disclosure.

FIG. 9 illustrates an example architecture of pre-training of the feature extraction model 120 in accordance with some embodiments of the present disclosure. In the pre-training stage, the pre-training may be performed with respective sample documents in the sample document set 112. The pre-training process for example may be performed by the pre-training device 110.

In FIG. 9 is shown the input sequence of the feature extraction model 120 determined from the sample document 902 (which may be included in the sample document set 112). The form of the input sequence at this time is similar to the input sequence discussed above with reference to FIG. 3 and FIG. 4. For example, the text recognition system 310 may be used to extract a text sequence from the sample document 902, and the feature map extractor 340 may be used to extract visual information. The feature extraction model 120 includes a visual embedding representation 934, an embedding representation 930 of the text element, an embedding representation 931 of the layout information, an embedding representation 932 of sequence index informa-tion, and an embedding representation 933 of segment identification information.

In some implementations, the self-supervision task for the pre-training includes a text masking-reconstruction task 950. Specifically, after the text sequence is extracted from the sample document 902 and before the text sequence is provided to the feature extraction model 120, a preprocess-ing module 914 may randomly mask one or more text elements in the text elements. For example, the text element is replaced with a predetermined symbol [MASK]. In FIG. 9, it is assumed that in the text sequence T1 to T7, the text elements T2 and T4 are masked. Correspondingly, the embedding representation 930 of the text element includes an embedding representation of [MASK], e.g., an all-zero vector. The self-supervision task requires the feature extrac-tion model 120 to be able to extract the semantic feature representations of the masked text elements, so that the masked text elements can be reconstructed according to the semantic feature representations.

In some implementations, the corresponding text ele-ments may be determined using a language model (LM), based on the semantic feature representation corresponding to the masked text element output from the feature extrac-tion model 120, for example, the semantic feature represen-tation corresponding to the symbol [MASK] in the output semantic feature representation 940. In some implementa-tions, the parameter values of the feature extraction model 120 may be updated based on a difference between the reconstructed text element and the ground-truthly-masked text element, so that the feature extraction model 120 can reduce such a difference based on the updated parameter values.

In some implementations, the self-supervision task addi-tionally or alternatively includes a text-image alignment task 952. Specifically, after the text sequence is extracted from the sample document 902, the preprocessing module 914 may randomly select one or more text elements from the text sequence. The preprocessing module 914 may mask the selected text elements from the image-format file 912 cor-responding to the sample document 902, for example by overlapping black blocks, so that the corresponding text document cannot be seen from the image-format file 912 visually. In addition, such a masking manner is also recorded to indicate which text element in the text sequence is masked and which text element is not masked. For example, in the example of FIG. 9, it is assumed that the text elements T1 and T3 corresponding to the text line 1 in the image-format file 912 are masked, and other text elements are not masked. In some implementations, since the resolution of image-format file is limited, text elements may be masked as per text lines.

In a case where partial region is masked, a feature map 922 characterizing visual information is extracted from the image-format file 912. At this time, the visual presentation corresponding to the masked text element might not be directly extracted in the feature map 922. The corresponding visual embedding representation 934 and other embedding representations are provided to the feature extraction model 120 for extracting the semantic feature representation of the text element. The text-image alignment task 952 requires the feature extraction model 120 to be able to extract the semantic feature representation of the text element, so that it can be determined whether the corresponding text element is masked in the image-format file 912 according to the semantic feature representation.

In some implementations, a cross-modal alignment model (LM) may be used to estimate the masking information based on the semantic feature representations corresponding to the respective text elements output from the feature extraction model 120, for example, the semantic feature representations corresponding to the respective text ele-ments in the output semantic feature representation 940, to indicate whether the corresponding text elements are masked in the image-format file 912. In some implementa-tions, the text elements masked in the text masking-recon-struction task 950 may not be considered.

In some implementations, the parameter values of the feature extraction model 120 may be updated based on a difference between the masking information determined in the preprocessing stage and the estimated masking informa-tion, so that the feature extraction model 120 can reduce such a difference based on the updated parameter values. The text-image alignment task 952 may enable the feature extraction model 120 to learn, from the visual information of the document, more features to accurately characterize the semantics of the text element.

In some implementations, as shown in FIG. 9, the output of the feature extraction model 120 may further include a visual feature representation. The visual feature representation may characterize information learned from the input embedding representation and related to the visual feature of the document. In this case, the self-supervision task for the pre-training further additionally or alternatively includes a text-image matching task 954. Such a task also promotes the pre-training of the model through the information in the two modalities: image and text.

According to the text-image matching task 954, it may be determined whether the image-format file match the sample document based on the visual feature representation 941 output by the feature extraction model. As shown in FIG. 9, the visual representation output by the feature extraction model 120 may include four visual feature representation portions corresponding to the feature embedding representations V1 to V4, respectively. In some implementations, the output feature representation corresponding to the input starting symbol [CLS] may be considered as a sum of the four visual feature representation portions, and therefore may be provided for determination of the image-format file and the sample document by the text-image matching model.

In the example of FIG. 9, if what is input is the sample document 902 and the image-format file 912 converted from the sample document 902, a ground-truth match result should be that the two match each other. If the match result determined by the text-image matching model based on the extracted visual feature representation is not matching, it is necessary to continue to update the feature extraction model 120 so as to determine a correct match result.

In some implementations, for the text-image matching task 954, a negative sample may also be constructed, which includes a sample document and a randomly-selected image-format file that do not match each other. Then, the text-image matching model determines the corresponding match result based on the visual feature representation output by the feature extraction model 120. Through the text-image alignment task 952 and the text-image matching task 954, the feature extraction model 120 may be enabled to have a capability of extracting features across modalities (image and text).

It should be appreciated that other self-supervision tasks may also be involved for pre-training the feature extraction model 120. Only one or some of the three self-supervision tasks discussed above may be considered. The implementations of the present disclosure are not limited in this respect.

After the pre-training process discussed with reference to FIG. 9, the pre-trained feature extraction model 120 may be used for various downstream tasks, and is not limited to the reading order detection task discussed above. For example, other downstream tasks may include a receipt understanding task, a document classification tasks, a table information extraction task, and so on. In particular, both the visual feature representation and/or the semantic feature representation output by the feature extraction model 120 may all be used to process the downstream tasks. Since the feature extraction model 120 has learned how to better extract features in the pre-training stage, it may quickly converge in training for a specific task and can demonstrate very good performance.

Example Process

FIG. 10 illustrates a flow chart of a process 1000 of reading order detection in accordance with some embodiments of the present disclosure. The process 1000 may be implemented by the model application system 120.

At block 1010, the model application system 120 determines a text sequence and layout information presented in the document. The text sequence includes a plurality of text elements, and the layout information indicates a spatial layout of the plurality of text elements in the document. At block 1020, the model application system 120 generates a plurality of semantic feature representations corresponding to the plurality of text elements based at least on the text sequence and layout information. At block 1030, the model application system 120 determines a reading order of the plurality of text elements in the document based on the plurality of semantic feature representations.

In some implementations, the layout information includes relative spatial positions and sizes of the plurality of text elements in the document.

In some implementations, generating the plurality of semantic feature representations comprises: for a first text element in the text sequence, determining an attention weight for the first text element with respect to a second text element in the text sequence based at least on one of the following: a relative spatial positioning of the first text element with respect to the second text element in the document, and a relative ranking position of the first text element with respect to the second text element within the text sequence, the attention weight indicating an importance degree of the second text element to the first text element; and determining a semantic feature representation of the first text element by weighting an embedding representation of the second text element with the determined attention weight.

In some implementations, generating the plurality of semantic feature representations comprises: determining an image-format file corresponding to the document; determining visual information from the image-format file, the visual information indicating visual appearances of the plurality of text elements presented in the document; and generating the plurality of semantic feature representations further based on the visual information.

In some implementations, generating the plurality of semantic feature representations comprises: converting the text sequence and the layout information into a first embedding representation and a second embedding representation, respectively; concatenating the first embedding representation and the second embedding representation, to obtain a concatenated embedding representation; and applying the concatenated embedding representation to a trained feature extraction model to generate the plurality of semantic feature representations.

FIG. 11 illustrates a flow chart of a process 1100 for model training in accordance with some embodiments of the present disclosure. The process 1100 may be implemented by the model training system 110.

At block 1110, the model training system 110 determines a text sequence, layout information and order labeling information presented in a first sample document. The text sequence includes a first set of text elements, the layout information indicates a spatial layout of the first set of text elements in the first sample document, and the order labeling information indicates a ground-truth reading order of the first set of text elements in the first sample document. At block 1120, the model training system 110 generates, using a feature extraction model, respective semantic feature representations of the first set of text elements at least based on the text sequence and the layout information. At block 1130, the model training system 110 determines, using an order determination model, a predicted reading order of the first set of text elements in the first sample document based on the semantic feature representations. At block 1140, the model training system 110 trains the feature extraction model and order determination model based on a difference between the predicted reading order and the ground-truth reading order.

In some implementations, the first sample document includes an editable text document. In some implementations, determining the order labeling information includes: determining format information corresponding to the editable text document, the format information at least indicating the ground-truth reading order of the first set of text elements.

In some implementations, determining the layout information includes: determining a vector file corresponding to the first sample document; and determining the layout information of the first set of text elements from the vector file.

In some implementations, a plurality of text elements that occur at different positions in the first sample document and represent a same text are assigned with different indices, and the plurality of text elements are labeled with different colors in the vector file, for each text element, the color labeled to the text element being determined based on the index assigned to the text element. In some implementations, determining the layout information of the first set of text elements from the vector file includes: assigning, based on the indices and the colors assigned to the plurality of text elements, layout information determined from the vector file to the plurality of text elements extracted from the first sample document.

In some implementations, generating the semantic feature representations includes: determining visual information from a first image-format file corresponding to the first sample document, the visual information indicating visual appearances of the first set of text elements presented in the first sample document; and generating, using the feature extraction model, the semantic feature representations further based on the visual information.

In some implementations, the method further comprises obtaining the pre-trained feature extraction model by: determining a second image-format file corresponding to a second sample document, the second sample document comprising a second set of text elements; generating, by masking at least one of the second set of text elements in the second image-format file, first masking information to indicate that the at least one text element is masked and other text elements of the second set of text elements are not masked; determining, using the feature extraction model, respective semantic feature representations of the second set of text elements; determining second masking information based on the respective semantic feature representations of the second set of text elements, the second masking information indicating whether respective text elements of the second set of text elements are masked or not; and pre-training the feature extraction model based on a difference between the first masking information and the second masking information.

In some implementations, the feature extraction model is further configured to generate a first visual feature representation of the first image-format file based on the text sequence, the layout information, and the visual information. In some implementations, the method further includes obtaining the feature extraction model that is pre-trained by: determining a third sample document, a third image-format file, and match labeling information, the match labeling information indicating whether the third image-format file matches with the third sample document or not; generating, using the feature extraction model, a second visual feature representation of the third image-format file based on the third sample document and the third image-format file; determining, based on the second visual feature representation, a match result indicating whether the third image-format file matches with the third sample document; and pre-training the feature extraction model based on a difference between the match result and the match labeling information.

Example Device

Figure 12:
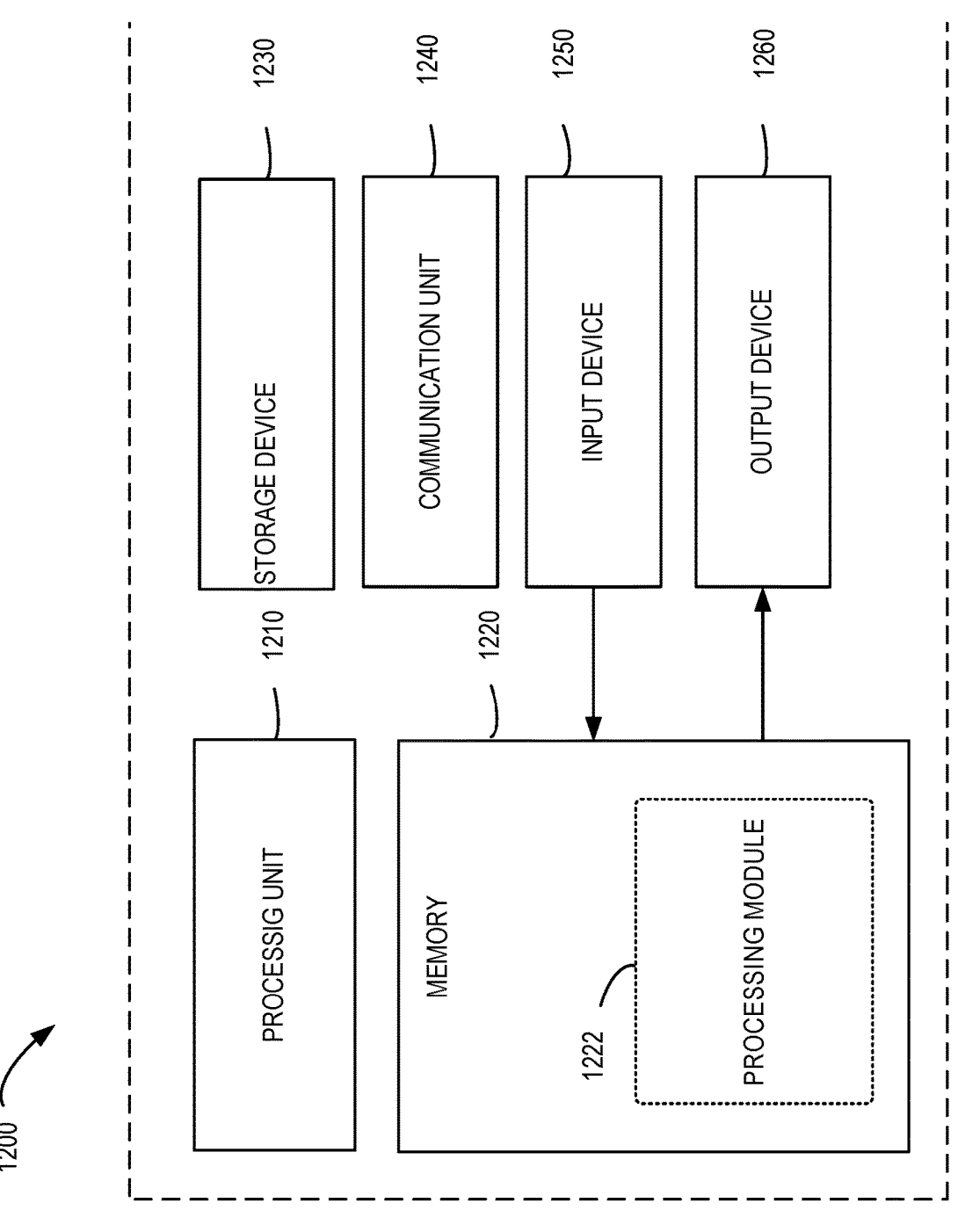
FIG. 12 illustrates a block diagram of a computing device that can achieve some embodiments of the present disclosure.

FIG. 12 illustrates a block diagram of a computing device 1200 that can achieve some embodiments of the present disclosure. It would be appreciated that the computing device 100 as shown in FIG. 12 is merely provided as an example, without suggesting any limitation to the functionalities and scope of embodiments of the present disclosure. The computing device 1200 may be used to implement an image encoding and/or image decoding processes according to embodiments of the subject matter described herein.

As shown in FIG. 12, the computing device 100 includes a computing device 1200 in form of a general-purpose computing device. Components of the computing device 1200 may include, but are not limited to, one or more processors or processing units 1210, a memory 1220, a storage device 1230, one or more communication units 1240, one or more input devices 1250, and one or more output devices 1260.

In some implementations, the computing device 1200 may be implemented as any user terminal or server terminal with computing capability. The server terminal may be any server, large-scale computing device, and the like provided by a variety of service providers. The user terminal may, for example, be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, TV receiver, radio broadcast receiver, E-book device, gaming device, or any combination thereof, including the accessories and peripherals of these devices, or any combination thereof. It is also anticipated that the computing device 1200 can support any type of interface to a user (such as "wearable" circuitry and the like).

The processing unit 1210 can be a physical or virtual processor and may execute various processes based on the programs stored in the memory 1220. In a multi-processor system, a plurality of processing units execute computer-executable instructions in parallel so as to enhance parallel processing capability of the computing device 1200. The processing unit 1210 may also be known as a central processing unit (CPU), a microprocessor, a controller, or a microcontroller.

The computing device 1200 usually includes various computer storage medium. The computer storage medium may be any available medium accessible by the computing device 1200, including but not limited to, volatile and non-volatile medium, or detachable and non-detachable medium. The memory 1220 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The memory 1220 may include a processing module 1222. This program module is configured to perform the functionalities of various implementations described herein. The processing module 1222 may be accessed and run by the processing unit 1210 to implement the corresponding functions.

The storage device 1230 may be any detachable or non-detachable medium and may include machine-readable medium that can be used for storing information and/or data and are accessible by the computing device 1200. The computing device 1200 may further include additional detachable/non-detachable, volatile/non-volatile memory medium. Although not shown in FIG. 12, there may be provided a disk drive for reading from or writing into a detachable and non-volatile disk, and an optical disk drive for reading from and writing into a detachable non-volatile optical disc. In such case, each drive may be connected to a bus (not shown) via one or more data medium interfaces.

The communication unit 1240 implements communication with another computing device via the communication medium. In addition, the functions of components in the computing device 1200 may be implemented by a single computing cluster or a plurality of computing machines that can communicate with each other via communication connections. Therefore, the computing device 1200 may operate in a networked environment using a logic connection with one or more other servers, network personal computers (PCs), or further general network nodes.

The input device 1250 may include one or more of a variety of input devices, such as a mouse, keyboard, tracking ball, voice-input device, and the like. The output device 1260 may include one or more of a variety of output devices, such as a display, loudspeaker, printer, and the like. By means of the communication unit 1240, the computing device 100 can further communicate with one or more external devices (not shown) such as storage devices and display devices, one or more devices that enable the user to interact with the computing device 1200, or any devices (such as a network card, a modem and the like) that enable the computing device 1200 to communicate with one or more other computing devices, if required. Such communication may be performed via input/output (I/O) interfaces (not shown).

In some implementations, as an alternative of being integrated on a single device, some or all components of the computing device 1200 may also be arranged in the form of cloud computing architecture. In the cloud computing architecture, the components may be provided remotely and work together to implement the functionalities described in the subject matter described herein. In some implementations, cloud computing provides computing, software, data access and storage service, which will not require end users to be aware of the physical locations or configurations of the systems or hardware provisioning these services. In various implementations, the cloud computing provides the services via a wide area network (such as Internet) using proper protocols. For example, a cloud computing provider provides applications over the wide area network, which can be accessed through a web browser or any other computing components. The software or components of the cloud computing architecture and corresponding data may be stored in a server at a remote position. The computing resources in the cloud computing environment may be aggregated or distributed at locations of remote data centers. Cloud computing infrastructure may provide the services through a shared data center, though they behave as a single access point for the users. Therefore, the cloud computing infrastructure may be utilized to provide the components and functionalities described herein from a service provider at remote locations. Alternatively, they may be provided from a conventional server or may be installed directly or otherwise on a client device.

The computing device 1200 can be used to implement reading order detection and/or model training in various embodiments of the present disclosure. The computing device 1200, e.g., the memory 1220 includes the processing module 1222 to perform reading order detection and/or model training in various embodiments of the present disclosure.

Example Implementations

In a first aspect, the subject matter described herein provides a computer-implemented method. The method comprises: determining a text sequence and layout information presented in a document, the text sequence comprising a plurality of text elements, the layout information indicating a spatial layout of the plurality of text elements in the document; generating a plurality of semantic feature representations corresponding to the plurality of text elements based at least on the text sequence and the layout information; and determining a reading order of the plurality of text elements in the document based on the plurality of semantic feature representations.

In some implementations, the layout information includes relative spatial positions and sizes of the plurality of text elements in the document.

In some implementations, generating the plurality of semantic feature representations comprises: for a first text element in the text sequence, determining an attention weight for the first text element with respect to a second text element in the text sequence based on at least one of the following: a relative spatial positioning of the first text element with respect to the second text element in the document, and a relative ranking position of the first text element with respect to the second text element in the text sequence, the attention weight indicating an importance degree of the second text element to the first text element; and determining a semantic feature representation of the first text element by weighting an embedding representation of the second text element with the determined attention weight.

In some implementations, generating the plurality of semantic feature representations comprises: determining an image-format file corresponding to the document; determining visual information from the image-format file, the visual information indicating visual appearances of the plurality of text elements presented in the document; and generating the plurality of semantic feature representations further based on the visual information.

In some implementations, generating the plurality of semantic feature representations comprises: converting the text sequence and the layout information into a first embedding representation and a second embedding representation, respectively; concatenating the first embedding representation and the second embedding representation, to obtain a concatenated embedding representation; and applying the concatenated embedding representation to a trained feature extraction model to generate the plurality of semantic feature representations.

In a second aspect, the subject matter described herein provides an electronic device. The electronic device comprises: a processor; and a memory coupled to the processor and having instructions stored thereon, the instructions, when executed by the processor, causing the device to perform acts comprising: determining a text sequence and layout information presented in a document, the text sequence comprising a plurality of text elements, the layout information indicating a spatial layout of the plurality of text elements in the document; generating a plurality of semantic feature representations corresponding to the plurality of text elements based at least on the text sequence and the layout information; and determining a reading order of the plurality of text elements in the document based on the plurality of semantic feature representations.

In some implementations, the layout information includes relative spatial positions and sizes of the plurality of text elements within the document.

In some implementations, generating the plurality of semantic feature representations comprises: for a first text element in the text sequence, determining an attention weight for the first text element with respect to a second text element in the text sequence based on at least one of the following: a relative spatial positioning of the first text element with respect to the second text element in the document, and a relative ranking position of the first text element with respect to the second text element in the text sequence, the attention weight indicating an importance degree of the second text element to the first text element; and determining a semantic feature representation of the first text element by weighting an embedding representation of the second text element with the determined attention weight.

In some implementations, generating the plurality of semantic feature representations comprises: determining an image-format file corresponding to the document; determining visual information from the image-format file, the visual information indicating visual appearances of the plurality of text elements presented in the document; and generating the plurality of semantic feature representations further based on the visual information.

In some implementations, generating the plurality of semantic feature representations comprises: converting the text sequence and the layout information into a first embedding representation and a second embedding representation, respectively; concatenating the first embedding representation and the second embedding representation, to obtain a concatenated embedding representation; and applying the concatenated embedding representation to a trained feature extraction model to generate the plurality of semantic feature representations.

In a third aspect, the subject matter described herein provides a computer program product being tangibly stored in a computer storage medium and comprising computer-executable instructions, the computer-executable instructions, when executed by a device, causing the device to perform one or more implementations of the method according to the first aspect.

In a fourth aspect, the subject matter described herein provides a computer readable medium having computer-executable instructions stored thereon, the computer-executable instructions, when executed by a device, causing the device to perform one or more implementations of the method according to the first aspect.

In a fifth aspect, the subject matter described herein provides a computer-implemented method. The method comprises: determining a text sequence layout information and order labeling information presented in a first sample document, the text sequence comprising a first set of text elements, the layout information indicating a spatial layout of the first set of text elements in the first sample document, the order labeling information indicating a ground-truth reading order of the first set of text elements within the first sample document; generating, using a feature extraction model, respective semantic feature representations of the first set of text elements at least based on the text sequence and the layout information; determining, using an order determination model, a predicted reading order of the first set of text elements within the first sample document based on the semantic feature representations; and training the feature extraction model and order determination model based on a difference between the predicted reading order and the ground-truth reading order.

In some implementations, the first sample document comprises an editable text document. In some implementations, determining the order labeling information comprises: determining format information corresponding to the editable text document, the format information at least indicating the ground-truth reading order of the first set of text elements.

In some implementations, determining the layout information comprises: determining a vector file corresponding to the first sample document; and determining the layout information of the first set of text elements from the vector file.

In some implementations, a plurality of text elements that occur at different positions in the first sample document and represent a same text are assigned with different indices, and the plurality of text elements are labeled with different colors in the vector file, the color with which each text element is labeled being determined based on the index assigned to the text element. In some embodiments, determining the layout information of the first set of text elements from the vector file comprises: assigning, based on the indices and the colors assigned to the plurality of text elements, layout information determined from the vector file to the plurality of text elements extracted from the first sample document.

In some implementations, generating the semantic feature representations comprises: determining visual information from a first image-format file corresponding to the first sample document, the visual information indicating visual appearances of the first set of text elements presented in the first sample document; and generating, using the feature extraction model, the semantic feature representations further based on the visual information.

In some implementations, the method further comprising obtaining the pre-trained feature extraction model by: determining a second image-format file corresponding to a second sample document, the second sample document comprising a second set of text elements; generating, by masking at least one of the second set of text elements in the second image-format file, first masking information to indicate that the at least one text element is masked and other text elements of the second set of text elements are not masked; determining, using the feature extraction model, respective semantic feature representations of the second set of text elements; determining second masking information based on the respective semantic feature representations of the second set of text elements, the second masking information indicating whether respective text elements of the second set of text elements are masked or not; and pre-training the feature extraction model based on a difference between the first masking information and the second masking information.

In some implementations, the feature extraction model is further configured to generate a first visual feature representation of the first image-format file based on the text sequence, the layout information, and the visual information. In some implementations, the method further comprises obtaining the pre-trained feature extraction model by: determining a third sample document, a third image-format file, and match labeling information, the match labeling information indicating whether the third image-format file matches with the third sample document; generating, using the feature extraction model, a second visual feature representation of the third image-format file based on the third sample document and the third image-format file; determining, based on the second visual feature representation, a match result indicating whether the third image-format file matches with the third sample document; and pre-training the feature extraction model based on a difference between the match result and the match labeling information.

In a six aspect, the subject matter described herein provides an electronic device. The electronic device comprises: a processor; and a memory coupled to the processor and having instructions stored thereon, the instructions, when executed by the processor, causing the device to perform acts comprising: determining a text sequence, layout information and order labeling information presented in a first sample document, the text sequence comprising a first set of text elements, the layout information indicating a spatial layout of the first set of text elements in the first sample document, the order labeling information indicating a ground-truth reading order of the first set of text elements in the first sample document; generating, using a feature extraction model, respective semantic feature representations of the first set of text elements based at least on the text sequence and the layout information; determining, using an order determination model, a predicted reading order of the first set of text elements in the first sample document based on the semantic feature representations; and training the feature extraction model and order determination model based on a difference between the predicted reading order and the ground-truth reading order.

In some implementations, the first sample document comprises an editable text document. In some implementations, determining the order labeling information comprises: determining format information corresponding to the editable text document, the format information at least indicating the ground-truth reading order of the first set of text elements.

In some implementations, determining the layout information comprises: determining a vector file corresponding to the first sample document; and determining the layout information of the first set of text elements from the vector file.

In some implementations, a plurality of text elements that occur at different positions in the first sample document and represent a same text are assigned with different indices, and the plurality of text elements are labeled with different colors in the vector file, the color with which each text element is labeled being determined based on the index assigned to the text element. In some embodiments, determining the layout information of the first set of text elements from the vector file comprises: assigning, based on the indices and the colors assigned to the plurality of text elements, layout information determined from the vector file to the plurality of text elements extracted from the first sample document.

In some implementations, generating the semantic feature representations comprises: determining visual information from a first image-format file corresponding to the first sample document, the visual information indicating visual appearances of the first set of text elements presented in the first sample document; and generating, using the feature extraction model, the semantic feature representations further based on the visual information.

In some implementations, the method further comprising obtaining the feature extraction model that is pre-trained by: determining a second image-format file corresponding to a second sample document, the second sample document comprising a second set of text elements; generating, by masking at least one of the second set of text elements in the second image-format file, first masking information to indicate that the at least one text element is masked and other text elements of the second set of text elements are not masked; determining, using the feature extraction model, respective semantic feature representations of the second set of text elements; determining second masking information based on the respective semantic feature representations of the second set of text elements, the second masking information indicating whether respective text elements of the second set of text elements are masked; and pre-training the feature extraction model based on a difference between the first masking information and the second masking information.

In some implementations, the feature extraction model is further configured to generate a first visual feature representation of the first image-format file based on the text sequence, the layout information, and the visual information. In some implementations, the method further comprises obtaining the pre-trained feature extraction model by: determining a third sample document, a third image-format file, and match labeling information, the match labeling information indicating whether the third image-format file matches with the third sample document; generating, using the feature extraction model, a second visual feature representation of the third image-format file based on the third sample document and the third image-format file; determining, based on the second visual feature representation, a match result indicating whether the third image-format file matches with the third sample document or not; and pre-training the feature extraction model based on a difference between the match result and the match labeling information.

In a seventh aspect, the subject matter described herein provides a computer program product being tangibly stored in a computer storage medium and comprising computer-executable instructions, the computer-executable instructions, when executed by a device, causing the device to perform one or more implementations of the method according to the fifth aspect.

In an eighth aspect, the subject matter described herein provides a computer readable medium having computer-executable instructions stored thereon, the computer-executable instructions, when executed by a device, causing the device to perform one or more implementations of the method according to the fifth aspect.

The functionalities described herein can be performed, at least in part, by one or more hardware logic components. As an example, and without limitation, illustrative types of hardware logic components that can be used include field-programmable gate arrays (FPGAs), Application-specific Integrated Circuits (ASICs), application-specific standard products (ASSPs), system-on-a-chip systems (SOCs), complex programmable logic devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method comprising:
executing a feature extraction neural network model that has been trained using example documents to determine a text sequence and layout information presented in a document, the text sequence comprising a plurality of text elements, the layout information indicating a spatial layout of the plurality of text elements in the document;
generating a plurality of semantic feature representations corresponding to the plurality of text elements based at least on the text sequence and the layout information;

wherein using the trained feature extraction neural network model to generate the plurality of semantic feature representations comprises:
converting the text sequence and the layout information into a first embedding representation and a second embedding representation, respectively;
concatenating the first embedding representation and the second embedding representation, to obtain a concatenated embedding representation; and
applying the concatenated embedding representation into the trained feature extraction neural network model to generate the plurality of semantic feature representations; and
determining a reading order of the plurality of text elements in the document based on the plurality of semantic feature representations provided by the trained feature extraction neural network model.

2. The method of claim 1, wherein generating the plurality of semantic feature representations comprises:
for a first text element in the text sequence,
determining an attention weight for the first text element with respect to a second text element in the text sequence based on at least one of the following: a relative spatial positioning of the first text element with respect to the second text element in the document, and a relative ranking position of the first text element with respect to the second text element in the text sequence, the attention weight indicating an importance degree of the second text element to the first text element; and
determining a semantic feature representation of the first text element by weighting an embedding representation of the second text element with the determined attention weight.

3. The method of claim 1, wherein generating the plurality of semantic feature representations comprises:
determining an image-format file corresponding to the document;
determining visual information from the image-format file, the visual information indicating visual appearances of the plurality of text elements presented in the document; and
generating the plurality of semantic feature representations further based on the visual information.

4. A computer-implemented method comprising:
executing a feature extraction neural network model that has been trained using example documents to determine a text sequence, layout information and order labeling information presented in a first sample document, the text sequence comprising a first set of text elements, the layout information indicating a spatial layout of the first set of text elements in the first sample document, the order labeling information indicating a ground-truth reading order of the first set of text elements in the first sample document;
generating, using the feature extraction neural network model, respective semantic feature representations of the first set of text elements based at least on the text sequence and the layout information;
executing an order determination neural network model to determine a predicted reading order of the first set of text elements in the first sample document based on the semantic feature representations; and
training the feature extraction neural network model and order determination neural network model based on a difference between the predicted reading order and the ground-truth reading order.

5. The method of claim 4, wherein the first sample document comprises an editable text document, and determining the order labeling information comprises:

determining format information corresponding to the editable text document, the format information at least indicating the ground-truth reading order of the first set of text elements.

6. The method of claim 4, wherein determining the layout information comprises:

determining a vector file corresponding to the first sample document; and determining the layout information of the first set of text elements from the vector file.

7. The method of claim 6, wherein a plurality of text elements that occur at different positions in the first sample document and represent a same text are assigned with different indices, and the plurality of text elements are labeled with different colors in the vector file, the color with which each text element is labeled being determined based on the index assigned to the text element; and wherein determining the layout information of the first set of text elements from the vector file comprises:

assigning, based on the indices and the colors assigned to the plurality of text elements, layout information determined from the vector file to the plurality of text elements extracted from the first sample document.

8. The method of claim 4, wherein generating the semantic feature representations comprises:

determining visual information from a first image-format file corresponding to the first sample document, the visual information representing visual appearances of the first set of text elements presented in the first sample document; and generating, using the feature extraction neural network model, the semantic feature representations further based on the visual information.

9. The method of claim 4, further comprising obtaining the pre-trained feature extraction neural network model by:

determining a second image-format file corresponding to a second sample document, the second sample document comprising a second set of text elements;

generating, by masking at least one text element of the second set of text elements in the second image-format file, first masking information to indicate that the at least one text element is masked and other text elements of the second set of text elements are not masked;

determining, using the feature extraction neural network model, respective semantic feature representations of the second set of text elements;

determining second masking information based on the respective semantic feature representations of the second set of text elements, the second masking information indicating whether respective text elements of the second set of text elements are masked; and pre-training the feature extraction model based on a difference between the first masking information and the second masking information.

10. The method of claim 8, wherein the feature extraction neural network model is further configured to generate a first visual feature representation of the first image-format file based on the text sequence, the layout information and the visual information, wherein the method further comprises obtaining the pre-trained feature extraction neural network model by:

determining a third sample document, a third image-format file, and match labeling information, the match labeling information indicating whether the third image-format file matches with the third sample document;

generating, using the feature extraction neural network model, a second visual feature representation of the third image-format file based on the third sample document and the third image-format file;

determining, based on the second visual feature representation, a match result indicating whether the third image-format file matches with the third sample document; and pre-training the feature extraction neural network model based on a difference between the match result and the match labeling information.

11. An electronic device, comprising:

a processor, and a memory coupled to the processor and having instructions stored thereon, the instructions, when executed by the processor, causing the device to perform acts comprising:

executing a feature extraction neural network model that has been trained using example documents to determine a text sequence and layout information presented in a document, the text sequence comprising a plurality of text elements, the layout information indicating a spatial layout of the plurality of text elements in the document;

generating a plurality of semantic feature representations corresponding to the plurality of text elements based at least on the text sequence and the layout information;

wherein using the trained feature extraction neural network model to generate the plurality of semantic feature representations comprises:

for a first text element in the text sequence, determining an attention weight for the first text element with respect to a second text element in the text sequence based on at least one of the following: a relative spatial positioning of the first text element with respect to the second text element in the document, and a relative ranking position of the first text element with respect to the second text element in the text sequence, the attention weight indicating to the trained feature extraction neural network model an importance degree of the second text element to the first text element; and determining a semantic feature representation of the first text element by weighting an embedding representation of the second text element with the determined attention weight; and determining a reading order of the plurality of text elements in the document based on the plurality of semantic feature representations provided by the trained feature extraction neural network model.

12. An electronic device, comprising:

a processor; and a memory coupled to the processor and having instructions stored thereon, the instructions, when executed by the processor, causing the device to perform acts comprising:

executing a feature extraction neural network model that has been trained using example documents to determine a text sequence, layout information and order labeling information presented in a first sample document, the text sequence comprising a first set of text elements, the layout information indicating a spatial layout of the first set of text elements in the first sample document, the order labeling information indicating a ground-truth reading order of the first set of text elements in the first sample document;

generating, using the feature extraction neural network model, respective semantic feature representations of the first set of text elements based at least on the text sequence and the layout information;

executing an order determination neural network model to determine a predicted reading order of the first set of text elements in the first sample document based on the semantic feature representations; and training the feature extraction neural network model and order determination neural network model based on a difference between the predicted reading order and the ground-truth reading order.

13. The device of claim 12, wherein the first sample document comprises an editable text document, and determining the order labeling information comprises:

determining format information corresponding to the editable text document, the format information at least indicating the ground-truth reading order of the first set of text elements.

\* \* \* \* \*